(12) United States Patent
Naruse et al.

(10) Patent No.: US 8,852,715 B2
(45) Date of Patent: Oct. 7, 2014

(54) HONEYCOMB STRUCTURE

(75) Inventors: Kazuya Naruse, Ibi-gun (JP); Sho Saito, Ibi-gun (JP); Toshiaki Shibata, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 826 days.

(21) Appl. No.: 13/015,588

(22) Filed: Jan. 28, 2011

(65) Prior Publication Data

US 2011/0229684 A1    Sep. 22, 2011

(30) Foreign Application Priority Data

Mar. 19, 2010  (WO) .................. PCT/JP2010/054793

(51) Int. Cl.
*B01D 46/24*       (2006.01)
*F01N 3/022*       (2006.01)
*C04B 35/565*      (2006.01)

(52) U.S. Cl.
CPC .................................. *B01D 46/247* (2013.01)
USPC .............. 428/116; 422/180; 55/523; 502/439

(58) Field of Classification Search
CPC .......... F01N 2330/321; F01N 2330/48; F01N 2330/60; F01N 2330/34
USPC .................. 428/116; 422/169–172, 177–182; 55/522–524; 502/439; D23/365
See application file for complete search history.

(56) References Cited

U.S. PATENT DOCUMENTS

| | | | |
|---|---|---|---|
| 8,257,460 B2 * | 9/2012 | Komori et al. | 428/116 |
| 2004/0258582 A1 * | 12/2004 | Miwa et al. | 55/523 |
| 2006/0269722 A1 * | 11/2006 | Yamada | 428/116 |
| 2009/0004073 A1 * | 1/2009 | Gleize et al. | 422/180 |
| 2009/0239028 A1 * | 9/2009 | Ohno et al. | 428/116 |
| 2009/0239031 A1 | 9/2009 | Ichikawa et al. | |
| 2010/0205918 A1 | 8/2010 | Dietzhausen et al. | |
| 2012/0251767 A1 * | 10/2012 | Ishikawa et al. | 428/116 |

FOREIGN PATENT DOCUMENTS

| | | |
|---|---|---|
| EP | 0867222 | 9/1998 |
| EP | 1862279 | 12/2007 |
| EP | 1977810 | 10/2008 |
| JP | 2001-206780 | 7/2001 |
| JP | 2002-326035 | 11/2002 |
| JP | 2003-254034 | 9/2003 |
| JP | 2004-154718 | 6/2004 |
| JP | 2007-533910 | 11/2007 |

(Continued)

OTHER PUBLICATIONS

Extended European Search Report for corresponding EP Application No. 10189634.8-2113, Aug. 3, 2011.

(Continued)

*Primary Examiner* — David Sample
*Assistant Examiner* — Nicholas W Jordan
(74) *Attorney, Agent, or Firm* — Mori & Ward, LLP

(57) ABSTRACT

A honeycomb structure includes a honeycomb block including at least one honeycomb fired body. The at least one honeycomb fired body has cell walls extending along a longitudinal direction of the at least one honeycomb fired body to define cells. The cells include peripheral cells in contact with peripheral walls of the at least one honeycomb fired body and basic cells positioned to be surrounded by the peripheral cells. The peripheral cells include an irregular cell having a cell cross-sectional area larger than a cell cross-sectional area of one of the basic cells.

47 Claims, 11 Drawing Sheets

(56) References Cited

FOREIGN PATENT DOCUMENTS

| JP | 2008168279 A | * | 7/2008 |
| JP | 2009-006326 | | 1/2009 |
| WO | WO 2005/102498 | | 11/2005 |
| WO | WO 2008/126335 | | 10/2008 |

OTHER PUBLICATIONS

International Search Report for corresponding International Application No. PCT/JP2010/054793, Jun. 29, 2010.

* cited by examiner

BACKGROUND ART

BACKGROUND ART

B-B line cross-sectional view

HONEYCOMB STRUCTURE

CROSS-REFERENCE TO RELATED APPLICATIONS

The present application claims priority under 35 U.S.C. §119 to International Application No. PCT/JP2010/054793 filed on Mar. 19, 2010, the contents of which are incorporated herein by reference in their entirety.

BACKGROUND OF THE INVENTION

1. Field of the Invention

The present invention relates to a honeycomb structure.

2. Discussion of the Background

In recent years, particulates (hereinafter, also referred to as "PM") such as soot contained in exhaust gases discharged from internal combustion engines of vehicles such as buses and trucks, construction machines and the like have raised serious problems as contaminants harmful to the environment and the human body. For this reason, various honeycomb structures made of porous ceramics have been proposed as honeycomb filters for collecting PM in exhaust gases to purify the exhaust gases and as catalyst carriers allowing exhaust gases pass through the inside thereof to convert the contaminants in the exhaust gases.

Conventionally-known honeycomb structures as above described include a honeycomb structure having a honeycomb block including a combination of a plurality of honeycomb fired bodies each having a large number of cells. FIG. 1A and FIG. 1B schematically illustrate examples of honeycomb fired bodies positioned at the outermost periphery of the honeycomb structure, among honeycomb fired bodies used to manufacture a conventional honeycomb structure (JP-A 2004-154718). Honeycomb fired bodies 1410 and 1420 illustrated in FIG. 1A and FIG. 1B respectively have cells 1411 and 1421 positioned closest to the curved surface forming the peripheral face of the honeycomb block. The cells 1411 and 1421 respectively have a substantially-triangular shape and a substantially-trapezoidal shape. Each of the cells 1411 and 1421 has a side formed along the curved surface.

It is necessary to seal either ends of the cells in the honeycomb fired body to use a honeycomb structure including the honeycomb fired body as an exhaust-gas purifying filter. The cells 1411 and 1421 positioned at the outermost periphery of the honeycomb fired bodies 1410 and 1420 have small opening areas, and therefore, a plug material paste may not easily fill the cells or may easily overflow or protrude from the cells. As a result, the cell is not sufficiently sealed.

Use of a honeycomb structure including the honeycomb fired body with insufficiently-filled cells as an exhaust-gas purifying filter causes a problem that the honeycomb structure allows exhaust gases flowing therein to flow out from the same cell without passing through a cell wall, resulting in a failure to fulfill the function as a filter.

There has been proposed another honeycomb structure in which a cell positioned at the outermost periphery and a cell not positioned at the outermost periphery have the same shapes so as to facilitate the filling of the cells with the plug material paste (WO 2008/126335 A1). FIG. 2A and FIG. 2B respectively illustrate exemplary conventional honeycomb fired bodies in which a cell positioned at the outermost periphery and a cell not positioned at the outermost periphery have the same shapes. All of cells 1111 and 1121 in honeycomb fired bodies 1110 and 1120 have substantially-square shapes in cross sections perpendicular to the longitudinal directions thereof. Positions of the cells 1111 and 1121 are designed so that the cells 1111 and 1121 are placed at regular intervals. In addition, peripheral walls 1116 and 1126 have level differences (difference in level such as stairs) corresponding to the positions of the cells 1111 and 1121 positioned at the outermost periphery so that a cell positioned at the outermost periphery and a cell not positioned at the outermost periphery have the same shapes.

According to this conventional honeycomb structure, even a cell positioned at the outermost periphery, which conventionally has a smaller opening area and is not easily filled with a plug material paste, has the same opening area as that of a cell not positioned at the outermost periphery. Accordingly, the cells are easily filled with a plug material paste so that manufacturing efficiency of the honeycomb structure is improved to some extent.

The contents of JP-A 2004-154718 and WO 2008/126335 A1 are incorporated herein by reference in their entirety.

SUMMARY OF THE INVENTION

According to one aspect of the present invention, a honeycomb structure includes a honeycomb block including at least one honeycomb fired body. The at least one honeycomb fired body has cell walls extending along a longitudinal direction of the at least one honeycomb fired body to define cells. The cells include peripheral cells in contact with peripheral walls of the at least one honeycomb fired body and basic cells positioned to be surrounded by the peripheral cells. The peripheral cells include an irregular cell having a cell cross-sectional area larger than a cell cross-sectional area of one of the basic cells.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
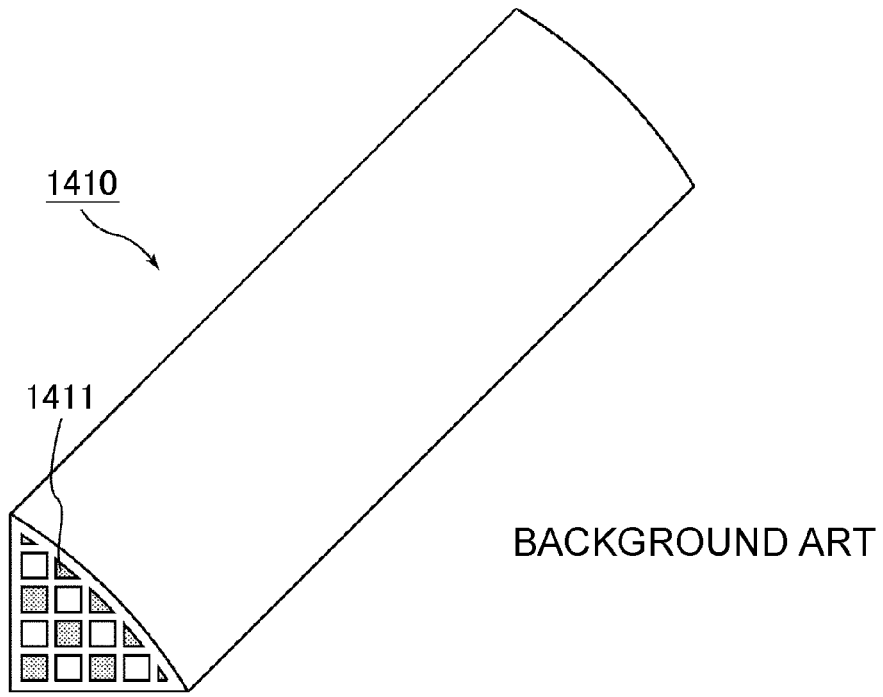
FIG. 1A is a perspective view illustrating an exemplary honeycomb fired body positioned at the outermost periphery of a conventional honeycomb structure.

The embodiments will now be described with reference to the accompanying drawings, wherein like reference numerals designate corresponding or identical elements throughout the various drawings.

A coat layer may be formed on the periphery of the honeycomb block with an aim of preventing exhaust gas leakage and improving the appearance of the honeycomb structure. A coat layer is formed by the process including the steps of applying a coating material paste to the periphery of the honeycomb block, equalizing the thickness of the applied coating material paste, and drying the coat material paste to solidify the paste.

A coat layer may be formed also in the conventional honeycomb structure disclosed in WO 2008/126335 A1 according to the above process. However, the honeycomb fired body therein has level differences on its peripheral wall, and therefore, more coating material paste is likely to be required to fill the level differences. In addition, it is necessary to apply the coating material paste carefully not to make any gaps along the level differences of the peripheral wall of the honeycomb fired body. This tends to lower the manufacturing efficiency.

Further, when seen from the end face of the conventional honeycomb structure disclosed in WO 2008/126335 A1, the level differences on the peripheral wall of the honeycomb fired body tends to increase the length (or amount) of the peripheral wall of the honeycomb structure compared to the case of the conventional honeycomb structure in which the honeycomb fired body has no level difference on its peripheral wall. In accordance with the increasing length (amount) of the peripheral wall of the honeycomb fired body, the material required for forming the honeycomb fired body is increased. Consequently, cost efficiency tends to be lowered compared to the case that the honeycomb structure includes the honeycomb fired body having no level differences on its peripheral wall.

Moreover, the increase in the weight of the honeycomb fired body leads to the increase in the weight of the entire honeycomb structure. The increase in the weight of the honeycomb structure tends to increase the heat capacity so that the temperature of the honeycomb structure during burning of PM is less likely to increase, which tends to cause decrease in the burning efficiency of PM.

In addition, the conventional honeycomb structure disclosed in WO 2008/126335 A1 includes a smaller number of honeycomb fired bodies, and therefore, the filtering area functioning as a filter is likely to reduce.

According to the embodiment of the present invention, a honeycomb structure has cells easily filled with a plug material paste for sealing cells, is efficiently manufacturable, secures the sufficient filtering area, and has excellent burning efficiency of PM.

A honeycomb structure according to an embodiment of the present invention includes a honeycomb block including a honeycomb fired body having a large number of cells longitudinally placed in parallel with one another with a cell wall therebetween. The cells include peripheral cells in contact with peripheral walls of the honeycomb fired body and basic cells positioned under the peripheral cells, and the peripheral cells include an irregular cell having a cell cross-sectional area larger than a cell cross-sectional area of one of the basic cells.

According to the embodiment of the present invention, the peripheral cells include the irregular cell having a cell cross-sectional area larger than that of the basic cell. In the conventional honeycomb structure, a cell having a smaller cell cross-sectional area as a result of the deformation of the cross-sectional shape of the cell (hereinafter, also referred to as a deformed cell) remains in the manufacture of the honeycomb structure and tends to lower the sealing efficiency of the cells. In contrast, in the honeycomb structure according to the embodiment of the present invention, when the formation of a deformed cell is expected, it is possible to form an irregular cell by removing a cell wall between the deformed cell and a basic cell. This is more likely to increase the cell cross-sectional area of the peripheral cell of the honeycomb structure so as to facilitate the filling the cell with a plug material paste.

In addition, the cell cross-sectional area is increased without any treatment performed on the peripheral wall of the honeycomb fired body, which is different from the case of the conventional honeycomb structure disclosed in WO 2008/126335 A1 in which level differences are provided on the peripheral wall of the honeycomb fired body so that the cell cross-sectional area of the deformed cell in contact with the peripheral wall of the honeycomb structure does not exist. Accordingly, it is easier to efficiently form a coat layer around the periphery of the honeycomb block including the honeycomb fired body.

As above described, formation of the irregular cell is more likely to increase the aperture ratio (opening ratio) of the honeycomb structure as a whole. Consequently, it is easier to suppress the increase in the pressure loss of the honeycomb structure during the capture of PM.

Further, the filtering area is reduced when level differences are provided for eliminating cells having the cross-sectional area smaller than that of the basic cells. However, the irregular cell in the embodiment of the present invention is a cell having the cell cross-sectional area larger than that of the basic cell, and therefore, the filtering area is less likely to reduce.

It is to be noted that the aperture ratio in the present description refers to a ratio (B/A) of the total (B) of the cell cross-sectional areas of cells opening on an end face of the honeycomb structure to the area (A) of the end face defined by the periphery of the end face.

In addition, in the case where the smaller cross-sectional area of a peripheral cell due to the formation of a deformed cell is expected, a cell wall between the deformed cell and a basic cell may be removed so that an irregular cell is formed. This is more likely to secure the sufficient cell cross-sectional area of the peripheral cell and is more likely to reduce the required amount of the materials for manufacturing the honeycomb structure by the amount of the materials for forming the cell wall, leading to cost reductions. Further, the weight of the honeycomb structure is reduced by the weight of the removed cell wall. This reduces the heat capacity of the honeycomb structure, and therefore, the temperature of the honeycomb structure is more easily raised during the burning of PM. Consequently, the burning efficiency of PM of the honeycomb structure is more likely to be improved.

In the conventional honeycomb structure placed on an exhaust-gas channel, exhaust gases tend to flow in the center part of the honeycomb structure than the peripheral part thereof. Therefore, PM tends to accumulate in the center part of the honeycomb structure. Accordingly, the degree of PM accumulation tends to differ between in the peripheral part and in the center part of the honeycomb structure. However, according to the honeycomb structure according to the embodiment of the present invention, formation of the irregular cell is more likely to increase the cell cross-sectional area especially in the peripheral part, and therefore, exhaust gases are more likely to flow into the peripheral part of the honeycomb structure. Therefore, PM tends to accumulate in the peripheral part of the honeycomb structure. As a result, it is easier to equalize the degree of PM accumulation between in the peripheral part and in the center part, compared to the case of the conventional honeycomb structure.

In the honeycomb structure according to the embodiment of the present invention, the honeycomb block preferably includes one honeycomb fired body.

In the honeycomb structure according to the embodiment of the present invention, it is preferable that the honeycomb block includes a plurality of honeycomb fired bodies bound to one another with an adhesive layer interposed therebetween, and at least one of the honeycomb fired bodies has the peripheral cells including an irregular cell having a cell cross-sectional area larger than that of the basic cell.

The honeycomb structure according to the embodiment of the present invention may include a honeycomb block having one honeycomb fired body (hereinafter, also referred to as an integral honeycomb structure), or alternatively, the honeycomb structure may include a honeycomb block having a plurality of honeycomb fired bodies bound to one another with an adhesive layer interposed therebetween (hereinafter, also referred to as an aggregated honeycomb structure).

In the honeycomb structure according to the embodiment of the present invention, the irregular cell is preferably formed at a position in contact with the peripheral wall forming the periphery of the honeycomb block among the peripheral walls of the honeycomb fired bodies. Especially in the case that the honeycomb block has a curved peripheral face, it is preferable that the deformed cell is likely to be formed at a position in contact with the peripheral wall forming the curved periphery of the honeycomb block. In such a case, a cell wall between the deformed cell and a basic cell may be removed to form an irregular cell. This is more likely to increase the cell cross-sectional area of the peripheral cell of the honeycomb structure so as to facilitate the filling of the peripheral cell with a plug material paste.

In the honeycomb structure according to the embodiment of the present invention, the irregular cell is preferably formed at a position in contact with the peripheral wall facing to the adhesive layer among the peripheral walls of the honeycomb fired bodies. Formation of the irregular cell according to the embodiment of the present invention at a position in contact with the peripheral wall facing to the adhesive layer is more likely to increase the aperture ratio of the honeycomb structure. Consequently, it is easier to suppress the increase in the pressure loss of the honeycomb structure during the PM accumulation.

Here, in the honeycomb block including a plurality of honeycomb fired bodies, an adhesive layer is provided between the honeycomb fired bodies. When the dimension (diameter) of the honeycomb structure is constant, the aperture ratio thereof is lowered by the thickness of the adhesive layer. However, formation of the irregular cell at a position in contact with the peripheral wall facing to the adhesive layer is more likely to increase the aperture ratio of the honeycomb structure. Consequently, it is easier to compensate the aperture ratio that is lowered by the thickness of the adhesive layer.

In the honeycomb structure according to the embodiment of the present invention, the basic cells preferably include a first basic cell formed by a first basic formation pattern and a second basic cell formed by a second basic formation pattern. The first basic cell preferably has a cell cross-sectional area larger than that of the second basic cell. Use of the first basic cell as a gas inlet side cell to which exhaust gases flow in is more likely to allow the aperture ratio on an exhaust gas inlet side of the honeycomb structure to be larger than the aperture ratio on an exhaust gas outlet side of the honeycomb structure. In this manner, it becomes easier to reduce the increasing rate of the pressure loss of the honeycomb structure during the PM accumulation.

In the honeycomb structure according to the embodiment of the present invention, it is preferable that the irregular cell has a cell cross-sectional area larger than that of the first basic cell and is adjacent to the second basic cell. When the honeycomb structure includes the first basic cell and the second basic cell as the basic cells, it is preferable that there is a case where the irregular cell is adjacent to both the first basic cell and the second basic cell. In such a case, it is easier to increase the aperture ratio of the honeycomb structure by forming an irregular cell adjacent to the second basic cell, which is used mainly as a gas outlet side cell from which exhaust gases flow out, and using the irregular cell as the gas inlet side cell. Consequently, it is easier to reduce the increasing rate of the pressure loss of the honeycomb structure during the PM accumulation.

As in the honeycomb structure according to the embodiment of the present invention, the irregular cell may have a cell cross-sectional area larger than that of the second basic cell and is adjacent to the first basic cell. Even in such a case, since the irregular cell has a cell cross-sectional area larger than that of the second basic cell, it is easier to fill the cell with a plug material paste. In this case, the irregular cell is normally used as the gas outlet side cell of the exhaust gas, but it may be used also as a gas inlet side cell of the exhaust gas.

In the honeycomb structure according to the embodiment of the present invention, it is preferable that the basic cells and the peripheral cells are alternately sealed at either end portions. Since either end portions of the cells are alternately sealed, the honeycomb structure is more likely to be suitably used as a filter.

In the honeycomb structure according to the embodiment of the present invention, it is preferable that the honeycomb block includes outer honeycomb fired bodies and an inner honeycomb fired body bound to one another with an adhesive layer interposed therebetween, the outer honeycomb fired bodies forming the periphery of the honeycomb block, the inner honeycomb fired body being positioned under the outer honeycomb fired bodies, at least one of the outer honeycomb fired bodies has the cells including outer peripheral cells in contact with the peripheral wall of that outer honeycomb fired bodies and outer basic cells that are positioned under the outer peripheral cells and formed by the basic formation pattern, and the outer peripheral cells include an outer irregular cell having a cell cross-sectional area larger than that of one of the outer basic cells.

In the honeycomb structure according to the embodiment of the present invention, at least one of the outer honeycomb fired bodies has outer peripheral cells, and therefore, this facilitates exertion of the following effects of: easy filling of the cells in the honeycomb fired bodies with a plug material paste; easy formation of the coat layer on the peripheral part of the honeycomb block; suppression of the increase in the pressure loss of the honeycomb structure during the PM accumulation; improvement in the burning efficiency of PM of the honeycomb structure; and equalization of PM accumulation amount between in the peripheral part and the center part of the honeycomb structure.

In the honeycomb structure according to the embodiment of the present invention, the outer irregular cell is preferably formed at a position in contact with the peripheral wall forming the periphery of the honeycomb block among the peripheral walls of the outer honeycomb fired bodies. Especially in the case that the honeycomb block has a curved peripheral face, it is preferable that a deformed cell is likely to be formed at a position in contact with the peripheral wall forming the curved periphery of the honeycomb block. In such a case, it is preferable that a cell wall between the deformed cell and a basic cell is removed to form an irregular cell. This preferably increases the cell cross-sectional area of the peripheral cell of the honeycomb structure so as to facilitate the filling of the peripheral cell with a plug material paste.

In the honeycomb structure according to the embodiment of the present invention, the irregular cell is preferably formed at a position in contact with the peripheral wall facing to the adhesive layer among the peripheral walls of the honeycomb fired bodies. Formation of the irregular cell of the embodiment of the present invention at a position in contact with the peripheral wall facing to the adhesive layer is more likely to increase the aperture ratio of the honeycomb structure. Consequently, it is easier to suppress the increase in the pressure loss of the honeycomb structure during the PM accumulation.

In the honeycomb structure according to the embodiment of the present invention, the outer basic cells include a first outer basic cell formed by a first basic formation pattern and a second outer basic cell formed by a second basic formation pattern. The first outer basic cell has a cell cross-sectional area larger than that of the second outer basic cell. Use of the first outer basic cell as a gas inlet side cell is more likely to allow the aperture ratio on an exhaust gas inlet side of the honeycomb structure to be larger than the aperture ratio on an exhaust gas outlet side of the honeycomb structure. In this manner, it is easier to reduce the increasing rate of the pressure loss of the honeycomb structure during the PM accumulation.

In the honeycomb structure according to the embodiment of the present invention, it is preferable that the outer irregular cell has a cell cross-sectional area larger than that of the first outer basic cell and is adjacent to the second outer basic cell. When the honeycomb structure includes the first outer basic cell and the second outer basic cell as the basic cells, it is preferable that there is a case that the outer irregular cell is adjacent to both the first outer basic cell and the second outer basic cell. In such a case, the aperture ratio of the honeycomb structure is more likely to be increased by forming an irregular cell adjacent to the second outer basic cell, which is used mainly as the exhaust gas outlet side cell, and using the irregular cell as the exhaust gas inlet side cell. Consequently, it is easier to reduce the increasing rate of the pressure loss of the honeycomb structure during the PM accumulation.

As in the honeycomb structure according to the embodiment of the present invention, the outer irregular cell may have a cell cross-sectional area larger than that of the second outer basic cell and is adjacent to the first outer basic cell. Even in such a case, since the irregular cell has a cell cross-sectional area larger than that of the second outer basic cell, the cell is easily filled with a plug material paste. In this case, the irregular cell is normally used as an exhaust gas outlet side cell, but it may be used also as an exhaust gas inlet side cell.

In the honeycomb structure according to the embodiment of the present invention, it is preferable that at least one of the inner honeycomb fired bodies has the cells including inner peripheral cells in contact with the peripheral walls of that inner honeycomb fired body and inner basic cells that are positioned under the inner peripheral cells and formed by the basic formation pattern, and the inner peripheral cells include an inner irregular cell having a cell cross-sectional area larger than that of one of the inner basic cells.

The outer honeycomb fired body and the inner honeycomb fired body include the outer irregular cell and the inner irregular cell, respectively, in the peripheral cells. Accordingly, it is easier to further increase the aperture ratio of the honeycomb structure compared to the case where the irregular cell is formed only in either the outer honeycomb fired body or the inner honeycomb fired body. Consequently, it is easier to more efficiently suppress the increase in the pressure loss of the honeycomb structure during the capture of PM. Here, the weight of the honeycomb structure is reduced by the weight of the removed cell wall between the deformed cell and the basic cell. In this case, the cell wall is removed not only in the outer honeycomb fired body, but also in the inner honeycomb fired body, and therefore, the weight of the honeycomb structure is more likely to be further reduced. This further reduces the heat capacity of the honeycomb structure, and therefore, the temperature of the honeycomb structure is more easily raised during the burning of PM. Consequently, the burning efficiency of PM of the honeycomb structure is more likely to be improved.

In the honeycomb structure according to the embodiment of the present invention, it is preferable that the honeycomb block includes outer honeycomb fired bodies and inner honeycomb fired bodies bound to one another with an adhesive layer interposed therebetween, the outer honeycomb fired bodies forming a periphery of the honeycomb block, the inner honeycomb fired bodies being positioned under the outer honeycomb fired bodies, at least one of the inner honeycomb fired bodies has the cells including inner peripheral cells in contact with peripheral walls of the inner honeycomb fired bodies and inner basic cells positioned under the inner peripheral cells, and the inner peripheral cells include an inner irregular cell having a cell cross-sectional area larger than a cell cross-sectional area of one of the inner basic cells.

As in the honeycomb structure according to the embodiment of the present invention, the inner irregular cell in the inner honeycomb fired body is more likely to improve the aperture ratio of the honeycomb structure. Accordingly, it is easier to suppress the increase in the pressure loss of the honeycomb structure during the capture of PM. Even the inner honeycomb fired body preferably has a deformed cell formed therein, for example, in the case where its cross-sectional shape perpendicular to the longitudinal direction thereof is partially formed by a curved line, or has a substantially-triangular shape, a substantially-trapezoidal shape, or the like. In such a case, it is easier to form an inner irregular cell suitably by removing a cell wall between the deformed cell and an inner basic cell so as to facilitate the filling of the cell with a plug material paste. Further, the weight of the honeycomb structure is reduced by the weight of the removed cell wall. This is more likely to reduce the heat capacity of the honeycomb structure, and therefore, the temperature of the honeycomb structure is more easily raised during the burning of PM. Consequently, the burning efficiency of PM of the honeycomb structure is more likely to be improved.

In the honeycomb structure according to the embodiment of the present invention, it is preferable that the inner basic cells include a first inner basic cell and a second inner basic cell, and the first inner basic cell has a cell cross-sectional area larger than a cell cross-sectional area of the second inner basic cell. Use of the first inner basic cell as an exhaust gas inlet side cell is more likely to allow the aperture ratio of the honeycomb structure on an exhaust gas inlet side of the honeycomb structure to be larger than that on an exhaust gas outlet side of the honeycomb structure. In this manner, it is easier to reduce the increasing rate of the pressure loss of the honeycomb structure during the PM accumulation.

In the honeycomb structure according to the embodiment of the present invention, it is preferable that the inner irregular cell has a cell cross-sectional area larger than the cell cross-sectional area of the first inner basic cell and is positioned adjacent to the second inner basic cell. When the honeycomb structure includes the first inner basic cell and the second inner basic cell as the basic cells, it is preferable that there is a case where the inner irregular cell is adjacent to both the first inner basic cell and the second inner basic cell. In such a case, the aperture ratio of the honeycomb structure is more likely to be increased by forming an inner irregular cell adjacent to the second inner basic cell, which is used mainly as the exhaust gas outlet side cell, and using the inner irregular cell as the exhaust gas inlet side cell. Consequently, it is easier to reduce the increasing rate of the pressure loss of the honeycomb structure during the PM accumulation.

As in the honeycomb structure according to the embodiment of the present invention, the inner irregular cell has a cell cross-sectional area larger than the cell cross-sectional area of the second inner basic cell and is positioned adjacent to the first inner basic cell. Even in such a case, since the inner irregular cell has a cell cross-sectional area larger than that of the second inner basic cell, the cell is more easily filled with a plug material paste. In this case, the inner irregular cell is normally used as an exhaust gas outlet side cell, but it may be used also as an exhaust gas inlet side cell.

As in the honeycomb structure according to the embodiment of the present invention, the cells in at least one of the outer honeycomb fired bodies include outer peripheral cells adjacent to peripheral walls of the outer honeycomb fired bodies and outer basic cells positioned under the outer peripheral cells, and the outer peripheral cells include an outer irregular cell having a cell cross-sectional area larger than a cell cross-sectional area of one of the outer basic cells. In this case, the outer honeycomb fired body and the inner honeycomb fired body include the outer irregular cell and the inner irregular cell, respectively, in the peripheral cells. Accordingly, it is easier to further increase the aperture ratio of the honeycomb structure compared to the case that the irregular cell is formed only in either the outer honeycomb fired body or the inner honeycomb fired body. Consequently, it is easier to more efficiently suppress the increase in the pressure loss of the honeycomb structure during the capture of PM. Here, the weight of the honeycomb structure is reduced by the weight of the removed cell wall between the deformed cell and the basic cell. In this case, the cell wall is removed not only in the inner honeycomb fired body, but also in the outer honeycomb fired body, and therefore, the weight of the honeycomb structure is more likely to be further reduced. This further reduces the heat capacity of the honeycomb structure, and therefore, the temperature of the honeycomb structure is more easily raised during the burning of PM. Consequently, the burning efficiency of PM of the honeycomb structure is more likely to be improved.

In the honeycomb structure according to the embodiment of the present invention, it is preferable that the cells in the outer honeycomb fired bodies and the inner honeycomb fired bodies are alternately sealed at either end portions. Since the cells in the outer honeycomb fired bodies and the inner honeycomb fired bodies are alternately sealed at either ends, the honeycomb structure is more suitably used as a filter.

In the present description, the outer irregular cell and the inner irregular cell, the outer peripheral cell and the inner peripheral cell, and the outer basic cell and the inner basic cell, which may be formed in the outer honeycomb fired body and the inner honeycomb fired body, may be simply referred to as an irregular cell, a peripheral cell, and a basic cell when it is not necessary to distinguish one from the other. In addition, when it is not necessary to distinguish the irregular cell, the peripheral cell, and the basic cell from one another, they may be simply referred to as a cell.

In the honeycomb structure, the basic cell refers to a minimum unit of cells repeatedly formed laterally and vertically when seen in the cross section of the honeycomb fired body perpendicular to its longitudinal direction. The minimum unit of cells includes a combination of cells having one or more kinds of cell shapes. For example, in a honeycomb fired body 120 according to the embodiment of the present invention illustrated in FIG. 5A and FIG. 5B, substantially-square cells are repeatedly formed when seen in the cross section of the honeycomb fired body perpendicular to its longitudinal direction. In that case, the substantially-square cell is the basic cell. These cells may be repeatedly formed as a minimum unit including two kinds of cells having different cell cross-sectional areas. In this case, the basic cell refers to a combination of two kinds of cells having different cross-sectional areas. However, there may be a case where one of the two kinds of cells is conveniently referred to as a basic cell. The basic formation pattern in the description refers to a shape of the basic cell.

The irregular cell is a peripheral cell in contact with the peripheral wall of the honeycomb fired body included in the honeycomb block. More specifically, the irregular cell is a cell having a cell cross-sectional area larger than that of the basic cell when seen in the cross section of the honeycomb fired body perpendicular to its longitudinal direction. In the case where the basic cell includes one kind of cell, the cell having a cross-sectional area larger than that of the basic cell is referred to as the irregular cell. In the honeycomb fired body in which the basic cell is a combination of two or more kinds of cells having different cross-sectional areas, the irregular cell refers to, for example, a cell having a cell cross-sectional area larger than that of the cell having a relatively large cross-sectional area, or a cell having a cell cross-sectional area larger than that of the cell having a relatively small cross sectional area. The irregular cell may be formed by removing a cell wall between a deformed cell and a basic cell adjacent to the deformed cell or a cell wall between a deformed cell and another deformed cell adjacent to the deformed cell.

The deformed cell refers to a cell, other than the irregular cell, having the cell cross-sectional area smaller than that of the basic cell. Further, "the cross sectional area" refers to the area of a cross section vertical to the longitudinal direction of the honeycomb fired body.

First Embodiment

Hereinafter, a first embodiment of the honeycomb structure of the present invention is described with reference to drawings.

A honeycomb structure of the present embodiment includes a honeycomb block including honeycomb fired bodies each having a large number of cells longitudinally placed in parallel with one another with a cell wall therebetween. The honeycomb fired bodies includes outer honeycomb fired bodies forming the periphery of the honeycomb block and an inner honeycomb fired body being positioned under the outer honeycomb fired bodies. At least one of the outer honeycomb fired bodies has the cells including outer peripheral cells in contact with peripheral walls of the outer honeycomb fired bodies and outer basic cells that are positioned under the outer peripheral cells and formed by a basic formation pattern. The outer peripheral cells include an outer irregular cell having a cell cross-sectional area larger than that of one of the outer basic cells.

In the honeycomb structure, at least one of the outer honeycomb fired bodies preferably has the cells including an outer irregular cell. Here, all the outer honeycomb fired bodies preferably have outer irregular cells because the effect of the embodiment of the present invention can be more surely exerted.

In addition, in the honeycomb structure, it is preferably a basic condition that the outer peripheral cells include at least one outer irregular cell. Here, the outer irregular cells are preferably formed over the entire periphery of the honeycomb block because the effect of the embodiment of the present invention can be more surely exerted.

Figure 3:
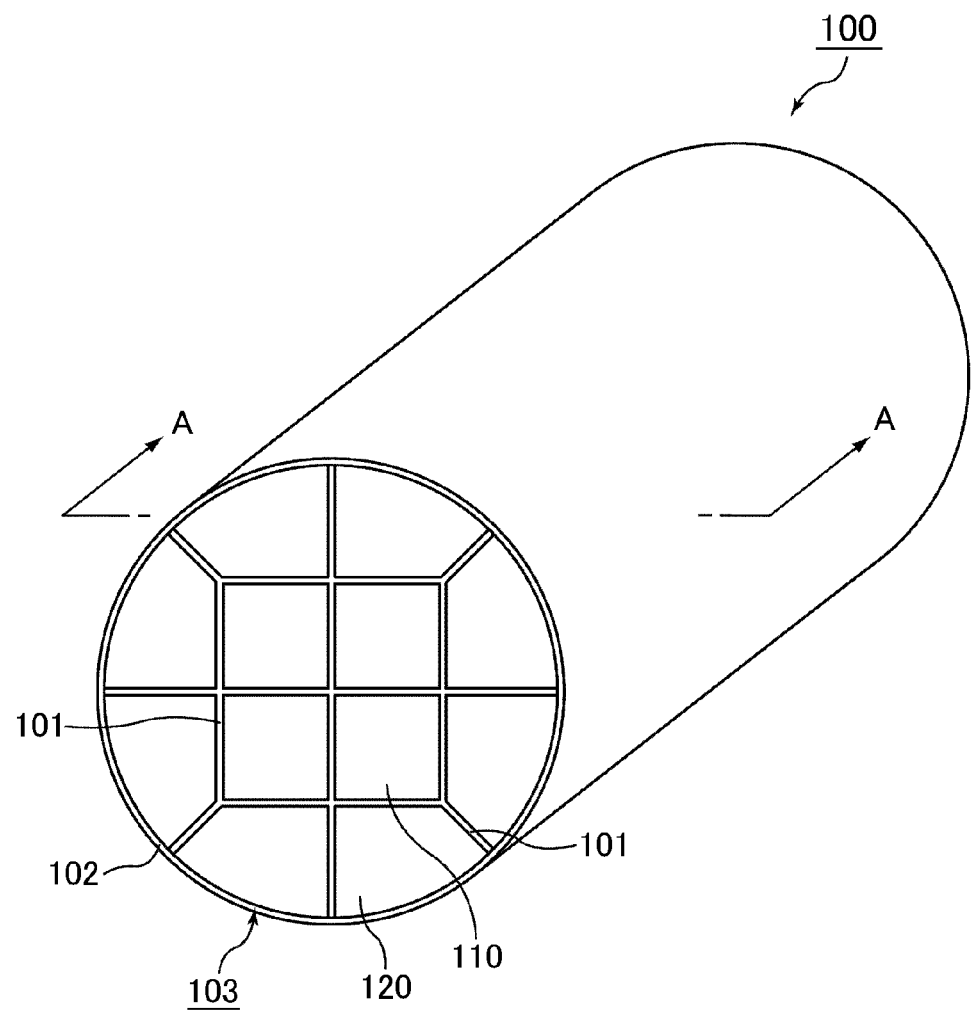
FIG. 3 is a perspective view schematically illustrating a honeycomb structure of a first embodiment of the present invention.
Figure 4A:
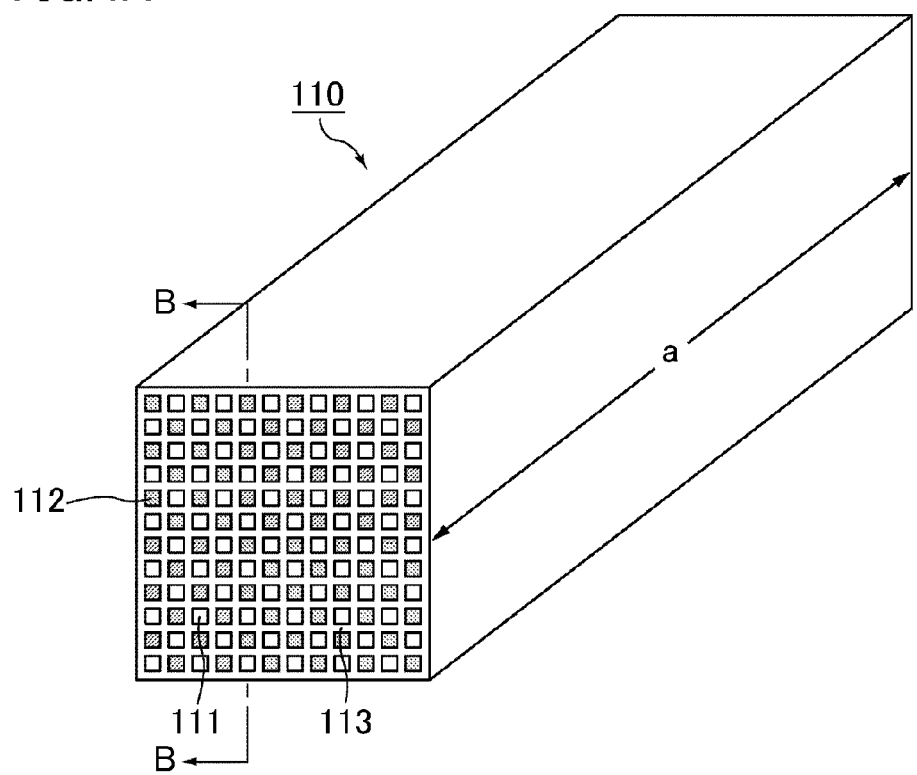
FIG. 4A is a perspective view schematically illustrating an inner honeycomb fired body in the honeycomb structure of the first embodiment of the present invention.
Figure 4B:
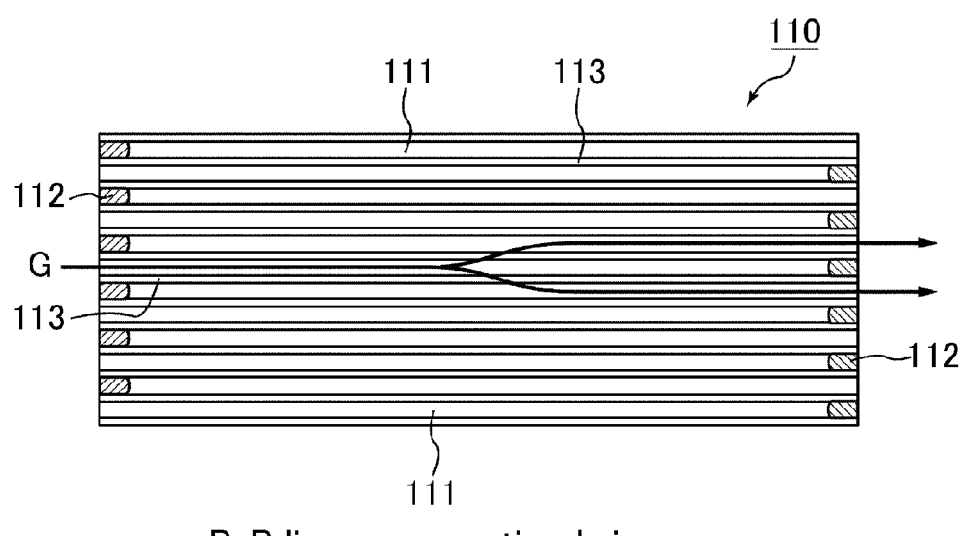
FIG. 4B is a cross sectional view of the inner honeycomb fired body in FIG. 4A taken along a B-B line.
Figure 5A:
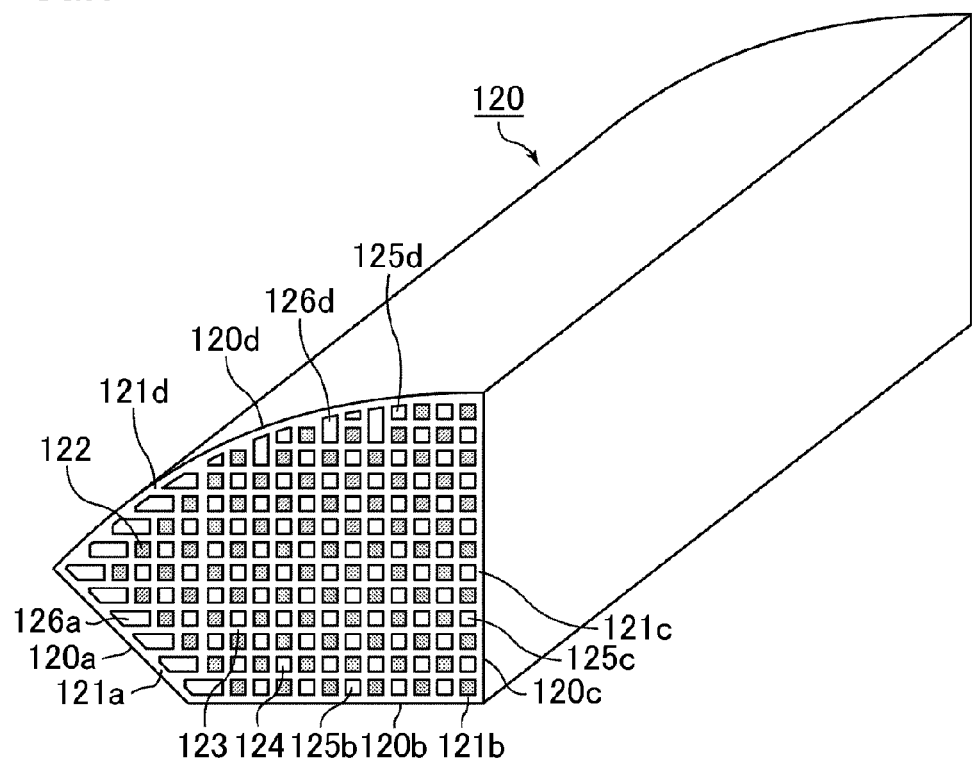
FIG. 5A is a perspective view schematically illustrating an outer honeycomb fired body in the honeycomb structure of the first embodiment of the present invention.
Figure 5B:
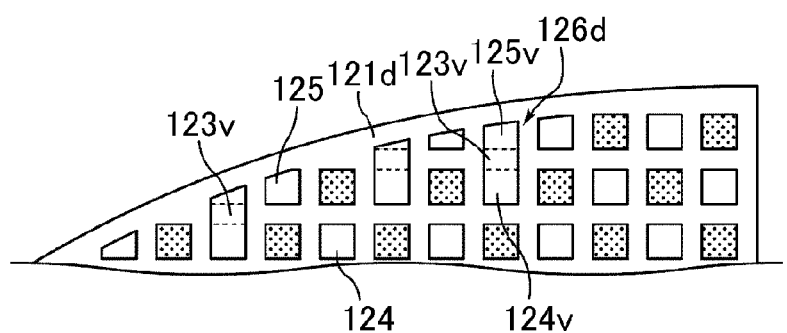
FIG. 5B is a partial enlarged view of the outer honeycomb fired body in FIG. 5A.
Figure 6:
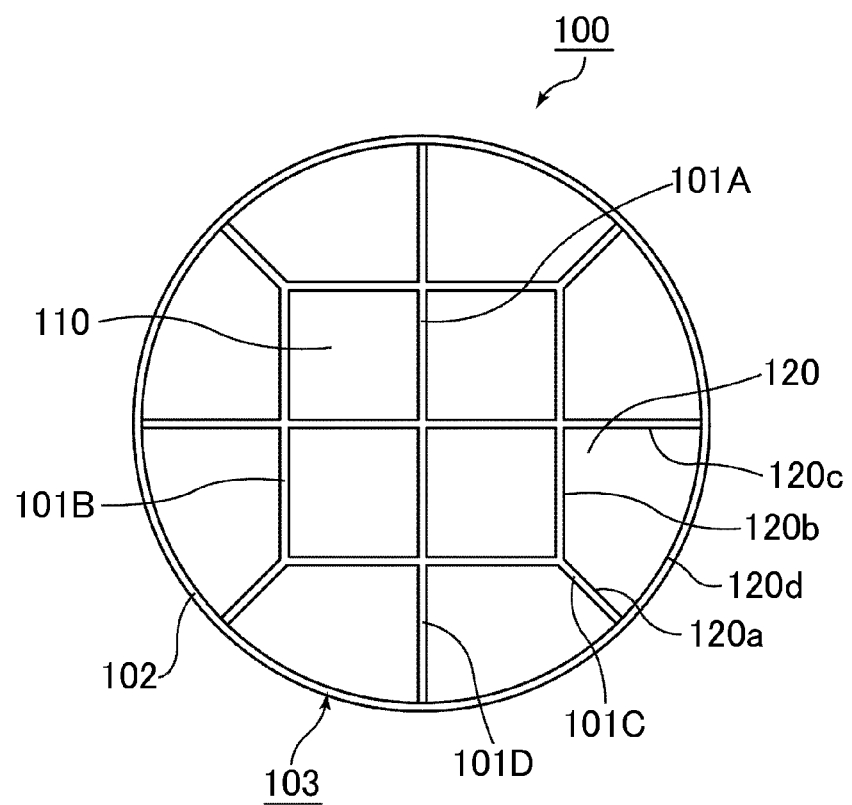
FIG. 6 is a cross sectional view taken along an A-A line in FIG. 3.

FIG. 3 is a perspective view schematically illustrating the honeycomb structure of the first embodiment of the present invention. FIG. 4A is a perspective view schematically illustrating an inner honeycomb fired body in the honeycomb structure of the first embodiment of the present invention. FIG. 4B is a cross sectional view taken along a B-B line in FIG. 4A. FIG. 5A and FIG. 5B are perspective views each schematically illustrating an outer honeycomb fired body in the honeycomb structure of the first embodiment of the present invention. FIG. 6 is a cross sectional view taken along an A-A line in FIG. 3.

In a honeycomb structure 100 illustrated in FIG. 3 and FIG. 6, a plurality of inner honeycomb fired bodies 110 in a shape as illustrated in FIGS. 4A and 4B and a plurality of outer honeycomb fired bodies 120 in a shape as illustrated in FIG. 5A and FIG. 5B are bound with adhesive layers 101 (101A to 101D) interposed therebetween to form a honeycomb block 103. Additionally, the honeycomb block 103 has a coat layer 102 formed on its periphery. The honeycomb fired bodies 110 and 120 are made of porous silicon carbide sintered bodies.

In the honeycomb structure 100, as illustrated in FIG. 3 and FIG. 6, eight outer honeycomb fired bodies 120 are positioned to form the periphery of the honeycomb block and four inner honeycomb fired bodies 110 are positioned under the outer honeycomb fired bodies. A total of 12 honeycomb fired bodies are bound to one another with the adhesive layers 101 in a manner such that the cross section of the honeycomb structure 100 (honeycomb block 103) becomes a substantially circular shape.

In the cross section of the honeycomb structure 100, an adhesive layer 101C is formed along the direction from the edge of one inner honeycomb fired body towards the peripheral face of the honeycomb structure 100 and an adhesive layer 101D is formed along the direction from the interspace between two inner honeycomb fired bodies towards the peripheral face of the honeycomb structure 100. The adhesive layer 101C and the adhesive layer 101D are formed at a predetermined angle (e.g. about 45°) to each other.

The cross-sectional shape of the inner honeycomb fired body 110 illustrated in FIG. 4A and FIG. 4B is substantially square. In the honeycomb fired body 110, a large number of cells 111 are longitudinally (direction of an arrow a in FIG. 4A) placed in parallel with one another with a cell wall 113 therebetween and either ends of the cells 111 are sealed with a plug (plug material paste) 112. Accordingly, exhaust gases G (see an arrow in FIG. 4B) having flowed into one of the cells 111 with an opening on one end face surely passes through the cell wall 113 separating the cells 111, and flows out from other cells 111 each with an opening on the other end face. When the exhaust gases G pass through the cell wall 113, the cell wall 113 captures PM and the like in the exhaust gases so that exhaust gases G are filtrated. Thus, the cell wall 113 of the honeycomb structure functions as a filter for capturing PM and the like.

In contrast, the cross-sectional shape of the outer honeycomb fired body 120 in FIG. 5A is a shape surrounded by three line segments 120a, 120b, and 120c and one arc 120d. Two angles formed by two line segments out of the three line segments (the angle formed by the line segments 120b and 120c and the angle formed by the line segments 120a and 120b) are 90° and 135°. Also in the outer honeycomb fired body 120, a large number of cells 124 are longitudinally placed in parallel with one another with a cell wall 123 therebetween and either ends of the cells 124 are sealed with a plug 122, in the same manner as in the inner honeycomb fired body 110. Accordingly, exhaust gases having flowed into one of the cells 124 with an opening on one end face surely passes through the cell wall 123 separating the cells 124, and flows out from another cell 124 with an opening on the other end face. Namely, the outer honeycomb fired body 120 has a filtering function that is in common with the function of the inner honeycomb fired body 110, though its external shape is different from that of the inner honeycomb fired body 110.

In the outer honeycomb fired body 120, the cells include outer peripheral cells 125 in contact with peripheral walls 121 (121a to 121d) of the outer honeycomb fired body 120 and outer basic cells 124 that are positioned under the outer peripheral cells 125 and formed by a basic formation pattern. Here, the outer peripheral cells 125 include outer irregular cells 126 (126a and 126d) each having a cell cross-sectional area larger than that of the outer basic cell 125.

The outer basic cells 124 are formed in a checkered pattern of the basic formation pattern. The cross-sectional shape of each of the outer basic cells 124 is square or substantially-square and the cell cross-sectional areas thereof are the same. Peripheral cells 125b and 125c in contact with the peripheral walls 121b and 121c, respectively, have the cell cross-sectional shape as same as that of the outer basic cell 124. In other words, the outer basic cells 124 maintaining its basic formation pattern come into contact with the peripheral walls 121b and 121c to be made into the outer peripheral cells 125b and 125c.

The outer irregular cells 126a and 126d are positioned so as to be in contact with the peripheral walls 121a and 121d out of the peripheral walls 121a to 121d. Since the peripheral wall 121d of the outer honeycomb fired body 120 also forms the periphery of the honeycomb block 103 (see FIG. 6), the outer irregular cell 126d is formed at a position in contact with the peripheral wall that forms the periphery of the honeycomb block 103 out of the peripheral walls of the honeycomb fired body.

Similarly, the outer irregular cell 126a is positioned so as to be in contact with the peripheral wall 121a. Since the peripheral wall 121a of the outer honeycomb fired body 120 faces the adhesive layer 101C (see FIG. 6), the outer irregular cell 126a is formed at a position in contact with the peripheral wall 121a facing the adhesive layer 101C.

Each of the outer irregular cells 126a and 126b has a cell cross-sectional area larger than that of the outer basic cell 124. As illustrated in FIG. 5A, especially in the case where the peripheral wall has a curved face and the like as with the peripheral walls 121a and 121d, a plurality of outer peripheral cells each having a cell cross-sectional area smaller than that of the outer basic cell 124 (i.e., deformed cells) are likely to be formed. Even in such a case, the aperture ratio of the outer honeycomb fired body can be increased by removing a cell wall between the deformed cell and the basic cell adjacent to the deformed cell to form an outer irregular cell, and peripheral cells are formed. Accordingly, cells are more easily filled with a plug material paste and it is easier to reduce the increasing rate of the pressure loss of the honeycomb structure during the PM accumulation.

The peripheral cells may include at least one outer irregular cell and it is not necessary to have all the peripheral cells as the outer irregular cells. The outer irregular cell may be provided in consideration of the shape of the peripheral wall of the honeycomb fired body and the shape of the peripheral cell which is determined by the peripheral wall. Hereinafter, how to provide the outer irregular cell in the outer honeycomb fired body is described with reference to a drawing.

FIG. 5B is a partial enlarged view schematically illustrating an outer honeycomb fired body in the honeycomb structure of the first embodiment of the present invention. The outer basic cells 124 are formed by a basic formation pattern in a manner such that the outer basic cells 124 spread outward, and the formation is terminated by the peripheral wall 121d of the honeycomb fired body. In such a formation, for example, when the formation of the outer basic cells 124 is terminated by the peripheral walls 121b and 121c in FIG. 5A, the basic formation pattern of the outer basic cell 124 is not broken by the peripheral walls 121b and 121c. Namely, the basic formation pattern is kept until cells in contact with the peripheral wall of the honeycomb fired body are formed as the outer peripheral cells (125b and 125c). Then, the formation of the cells is terminated.

In contrast, in the case where the formation of the outer basic cells 124 is terminated by the peripheral walls 121a and 121d of the honeycomb fired body, the basic formation pattern of the outer basic cell 124 is broken because the peripheral wall 121a obliquely cross the cell wall determined by the basic formation pattern and the peripheral wall 121d has a curved face. Then, the outer basic cells 124 are deformed so that deformed cells each having a cell cross-sectional area smaller than that of the outer basic cell 124 are formed as peripheral cells (a temporary deformed cell indicated by 125v in FIG. 5B). Such a deformed cell makes it hard to alternately fill the cells. Consequently, the manufacturing efficiency of the honeycomb structure tends to be lowered.

In the embodiment of the present invention, an outer irregular cell 126d having a cell cross-sectional area larger than that of the outer basic cell 124 is formed, when formation of the deformed cell 125v is expected because the peripheral wall has a curved face like the peripheral wall 121d or the peripheral wall obliquely cross the cell wall determined by the basic formation pattern like the peripheral wall 121a. More specifically, the outer irregular cell 126 is formed by removing a temporary cell wall 123v between the temporary deformed cell 125v which would be formed and a temporary outer basic cell 124v. In other words, the temporary irregular cell 126d and the temporary outer basic cell 124v are bound to form the outer irregular cell 126d. Further, the temporary deformed cell 125v and the temporary outer basic cell 124v may be bound as illustrated in FIG. 5B, or alternatively, the temporary deformed cell 125v and the outer peripheral cell 125 adjacent to the temporary deformed cell 125v may be bound. Formation of the outer irregular cell in this manner is more likely to avoid a deformed cell having a small cell cross-sectional area, which is not easily filled with a plug material paste, and is more likely to improve the aperture ratio of the outer honeycomb fired body.

Here, it is not necessary to bind all the deformed cells expected to be formed, with the outer basic cells to form the outer irregular cells. The deformed cell may be bound with the adjacent outer basic cell only when the deformed cell, which is to be sealed according to the pattern of alternate sealing, is expected to have insufficient cell cross-sectional area. Of course, the basic formation pattern may be modified to form all the peripheral cells as the outer irregular cells.

There may be a case where the deformed cell has a cell cross-sectional area sufficient to be filled with a plug material paste and is not necessarily bound with the outer basic cell. The cell cross-sectional area of the deformed cell is not particularly limited in the case that the deformed cell to be sealed is bound with the outer basic cell to form the outer irregular cell, and it is preferably about 80% or less, more preferably about 70% or less, further preferably about 60% or less, and particularly preferably about 50% or less of the cell cross-sectional area of the outer basic cell. If the deformed cell has a cell cross-sectional area that is about 80% or less of the cell cross-sectional area of the outer basic cell, formation of the outer irregular cell is less likely to be omitted because it is more likely to be difficult to fill the cell with a plug material paste. However, even in the case that the deformed cell has a comparatively-large cell cross-sectional area, the outer irregular cell may be formed as desired.

In the honeycomb structure of the present embodiment, each of eight outer honeycomb fired bodies has an outer irregular cell formed therein as illustrated in FIG. 5A and each of four inner honeycomb fired bodies may not have an irregular cell. Even in the case that the inner honeycomb fired bodies do not have irregular cells (if provided, they may be referred to as inner irregular cells), the honeycomb structure of the present embodiment can sufficiently exert the effects of the embodiment of the present invention. Of course, the inner honeycomb fired bodies may have inner irregular cells formed therein. In the case that the inner honeycomb fired bodies have inner irregular cells formed therein, it is easier to synergistically enhance the effects including weight loss of the honeycomb structure, cost reduction, and improvement in burning efficiency of PM of the honeycomb structure, as the entire honeycomb structure.

Next, a description is given on a method for manufacturing the honeycomb structure of the present embodiment.

The method for manufacturing the honeycomb structure is for manufacturing a honeycomb structure including a honeycomb block including honeycomb fired bodies each having a large number of cells longitudinally placed in parallel with one another with a cell wall therebetween. The honeycomb fired bodies includes outer honeycomb fired bodies forming a periphery of the honeycomb block and an inner honeycomb fired body being positioned under the outer honeycomb fired bodies. At least one of the outer honeycomb fired bodies has the cells including outer peripheral cells in contact with peripheral walls of the outer honeycomb fired bodies and outer basic cells that are positioned under the outer peripheral cells and formed by a basic formation pattern. The outer peripheral cells include an outer irregular cell having a cell cross-sectional area larger than that of one of the outer basic cells.

The method includes the steps of extrusion-molding a wet mixture containing ceramic powder and a binder to manufacture honeycomb molded bodies to be made into an outer honeycomb fired body and an inner honeycomb fired body, sealing (plugging) predetermined cells in the honeycomb molded bodies by filling the cells with a plug material paste that is to be a plug, degreasing the honeycomb molded body by heating so that organic matters contained therein are decomposed and removed, firing the degreased honeycomb molded bodies to manufacture an inner honeycomb fired body and an outer honeycomb fired body, and manufacturing a honeycomb block by applying an adhesive paste on side faces of the inner honeycomb fired body and the outer honeycomb fired body to form adhesive paste layers and binding a plurality of the honeycomb fired bodies by interposing the adhesive paste layers.

In the method for manufacturing the honeycomb structure of the present embodiment, a coat layer may be formed by applying a coating material paste on the periphery of the obtained honeycomb block and drying the applied paste until being solidified.

(1) In the method for manufacturing the honeycomb structure of the present embodiment, a wet mixture containing ceramic powder and a binder is extrusion-molded to manufacture a honeycomb molded body. More specifically, carbide powders having different average particle sizes as ceramic powder, an organic binder, a liquid plasticizer, a lubricant, and water are mixed to prepare a wet mixture for manufacturing a honeycomb molded body. Then, the wet mixture is charged into an extrusion molding machine and extrusion-molded to manufacture honeycomb molded bodies in predetermined shapes.

Here, various dies for extrusion molding are used in accordance with the shape of the honeycomb fired bodies such as a honeycomb fired body having a substantially-square cross section, and a honeycomb fired body having a cross section surrounded by three line segments and one arc, with the two angles of about 90° and about 135° made by two line segments out of the three line segments.

(2) Next, the honeycomb molded bodies are cut at a predetermined length and dried with use of a drying apparatus such as a microwave drying apparatus, a hot-air drying apparatus, a dielectric drying apparatus, a reduced-pressure drying apparatus, a vacuum drying apparatus, and a freeze drying apparatus. Then, predetermined cells are filled with a plug material paste to be sealed. Conditions for cutting, drying, and sealing may be conditions conventionally used for manufacturing honeycomb fired bodies.

(3) Next, the honeycomb molded body is degreased by heating organic matters contained therein in a degreasing furnace. Then, the degreased honeycomb molded body is transported to a firing furnace and fired to manufacture a honeycomb fired body. Conditions for degreasing and firing may be conditions conventionally used for manufacturing honeycomb fired bodies. In this manner, the inner honeycomb fired body and the outer honeycomb fired body can be manufactured.

(4) Next, an adhesive paste is applied to a predetermined side faces of the inner honeycomb fired body and the outer honeycomb body, which have cells each sealed at predetermined end portion, to form adhesive paste layers. On each of the adhesive paste layers, other honeycomb fired bodies are sequentially laminated so that a predetermined number of honeycomb fired bodies are bound. Then the adhesive paste is dried to be solidified so that a honeycomb block is manufactured.

Here, the adhesive paste contains, for example, an inorganic binder, an organic binder, and inorganic particles. The adhesive paste may further contain at least one of an inorganic fiber and a whisker.

(5) Finally, a coating material paste is applied to the periphery of the substantially round pillar-shaped honeycomb block, and is dried to be solidified to produce a coat layer. The coating material paste may be a paste similar to or different from the adhesive paste. It is to be noted that the coat layer is not necessarily formed and may be formed according to need. In the case where the coat layer is formed, the adhesive paste and the coating material paste may be concurrently dried to be solidified. In this manner, it is possible to manufacture the honeycomb structure of the present embodiment.

Hereinafter, the effects of the honeycomb structure of the present embodiment are listed.

(1) The honeycomb structure of the present embodiment includes at least one outer irregular cell having a cell cross-sectional area larger than that of the outer basic cell. Therefore, it is easier to obtain effects of facilitation of the filling of cells with a plug material paste and formation of a coat layer on the peripheral portion of the honeycomb block, suppression of the increase in the pressure loss of the honeycomb structure during the PM accumulation, improvement in the burning efficiency of PM of the honeycomb structure, and equalization of PM accumulation amount between in the peripheral part and in the center part of the honeycomb structure.

(2) In the honeycomb structure of the present embodiment, the outer irregular cell is formed at a position at least in contact with the peripheral wall forming the periphery of the honeycomb block out of the peripheral walls of the outer honeycomb fired bodies. Especially, when the honeycomb block has a curved peripheral face, the deformed cell is likely to be formed at a position in contact with the peripheral wall forming the curved periphery of the honeycomb block. Even in such a case, it is easier to increase the opening area of the peripheral cells by forming the irregular cell by removing the cell wall between the deformed cell and the basic cell. This is more likely to facilitate the filling of the peripheral cells with a plug material paste.

(3) In the honeycomb structure of the present embodiment, the outer irregular cell is also formed at a position in contact with the peripheral wall facing to the adhesive layer out of the peripheral walls of the outer honeycomb fired bodies. The outer irregular cell formed at a position in contact with the peripheral wall facing to the adhesive layer is more likely to increase the aperture ratio of the honeycomb structure. Consequently, it is easier to suppress the increase in the pressure loss of the honeycomb structure during the PM accumulation.

(4) In the honeycomb structure of the present embodiment, the basic cells and the peripheral cells are alternately sealed at either end portions. Since either end portions of the cells are alternately sealed, the honeycomb structure is more likely to be suitably used as a filter.

EXAMPLES

Example 1

Hereinafter, examples are given for more specifically describing the first embodiment of the present invention. However, the present invention is not limited only to these examples.

An amount of 52.8% by weight of a silicon carbide coarse powder having an average particle size of 22 μm and 22.6% by weight of a silicon carbide fine powder having an average particle size of 0.5 μm were mixed. To the resulting mixture, 2.1% by weight of an acrylic resin, 4.6% by weight of an organic binder (methylcellulose), 2.8% by weight of a lubricant (UNILUB, manufactured by NOF Corporation), 1.3% by weight of glycerin, and 13.8% by weight of water were added, and then kneaded to prepare a wet mixture. The obtained wet mixture was extrusion-molded. In this process, there were manufactured: a raw honeycomb molded body having approximately the same shape as that of the inner honeycomb fired body 110 illustrated in FIG. 4A and FIG. 4B with cells not sealed; and a raw honeycomb molded body having approximately the same shape as that of the outer honeycomb fired body 120 illustrated in FIG. 5A with cells not sealed. In peripheral cells of the honeycomb molded body that is to be an outer honeycomb fired body, an outer irregular cell having a cell cross-sectional area larger than that of the outer basic cell is provided.

(2) Next, the raw honeycomb molded bodies were dried by using a microwave drying apparatus to obtain dried honeycomb molded bodies. Predetermined cells were filled with a plug material paste having the same composition as that of the wet mixture, and the filled portions of the dried honeycomb molded bodies were dried by using a drying apparatus again.

(3) The dried honeycomb molded bodies were degreased at 400° C., and then fired at 2200° C. under normal pressure argon atmosphere for three hours.

Thus, an inner honeycomb fired body 110 including a porous silicon carbide sintered body and having a porosity of 45%, an average pore size of 15 μm, a size of 34.5 mm×34.5 mm×150 mm, the number of cells (cell density) of 300 pcs/inch$^2$ and a thickness of cell walls of 0.25 mm (10 mil) was manufactured.

Also, an outer honeycomb fired body 120 having the same porosity, the same average pore size, the same number of cells (cell density) and the same thickness of cell walls as those of the inner honeycomb fired body 110 and also having a cross-sectional shape surrounded by three line segments and an arc, with the two angles, formed by two line segments out of these three line segments, being 90° and 135° (line segment 120$a$=20.8 mm, line segment 120$b$=35.0 mm, and line segment 120$c$=35.7 mm) was manufactured.

(4) An adhesive paste was applied to predetermined side faces of the inner honeycomb fired body 110 and the outer honeycomb fired body 120, and four pieces of the inner honeycomb fired bodies 110 and eight pieces of the outer honeycomb fired bodies 120 were bonded to one another with the adhesive paste interposed therebetween so as to be arranged as shown in FIG. 3. The adhesive paste was solidified at 180° C. in 20 minutes to manufacture a round pillar-shaped honeycomb block 103 having the adhesive layer 1 mm in thickness. Here, as the adhesive paste, an adhesive paste containing 30.0% by weight of silicon carbide particles having an average particle size of 0.6 μm, 21.4% by weight of silica sol (solids content of 30% by weight), 8.0% by weight of carboxymethyl cellulose and 40.6% by weight of water, was used.

(5) By using a coating material paste having the same composition as that of the adhesive paste used in the process (4), a coating material paste layer was formed on the peripheral portion of the ceramic block 103. Thereafter, the coating material paste layer was dried at 120° C. to manufacture a round pillar-shaped honeycomb structure 100 having a size of 143.8 mm in diameter×150 mm in length with a coat layer 102 formed on the periphery thereof.

Comparative Example 1

Figure 2A:
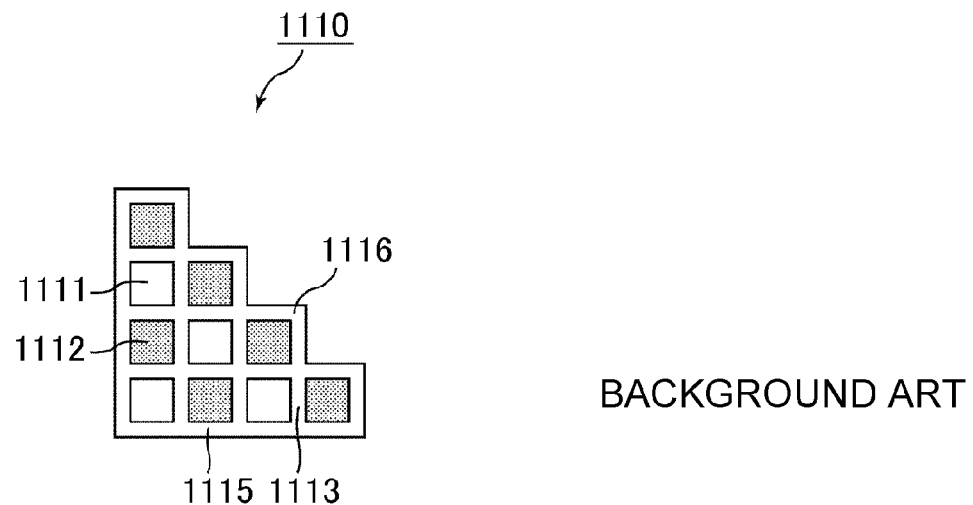
FIG. 2A is a front view illustrating an exemplary honeycomb fired body in which a cell positioned at the outermost periphery of a conventional honeycomb fired body and a cell not positioned at the outermost periphery have the same shape.
Figure 2B:
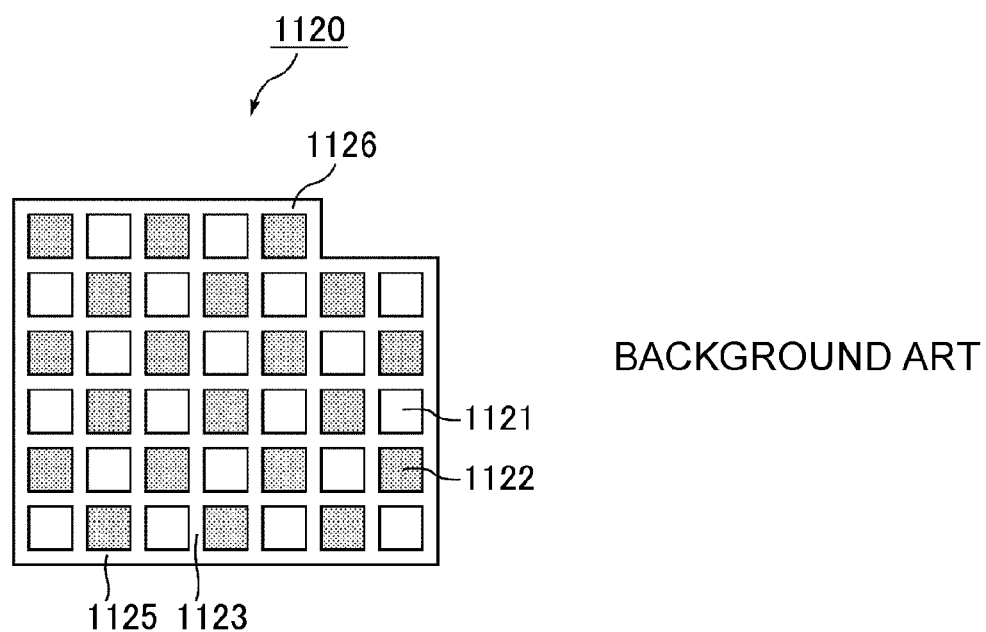
FIG. 2B is a front view illustrating another exemplary honeycomb fired body in which a cell positioned at the outermost periphery of a conventional honeycomb fired body and a cell not positioned at the outermost periphery have the same shape.

A honeycomb structure was manufactured in the same manner as in Example 1, except that the outer honeycomb fired body used here was a honeycomb fired body (see FIG. 2A and FIG. 2B) in which the peripheral wall was provided with level differences corresponding to the cells positioned at the outermost periphery and the cell positioned at the outermost periphery had the same shape as that of the cell not positioned at the outermost periphery.

Comparative Example 2

Figure 1B:
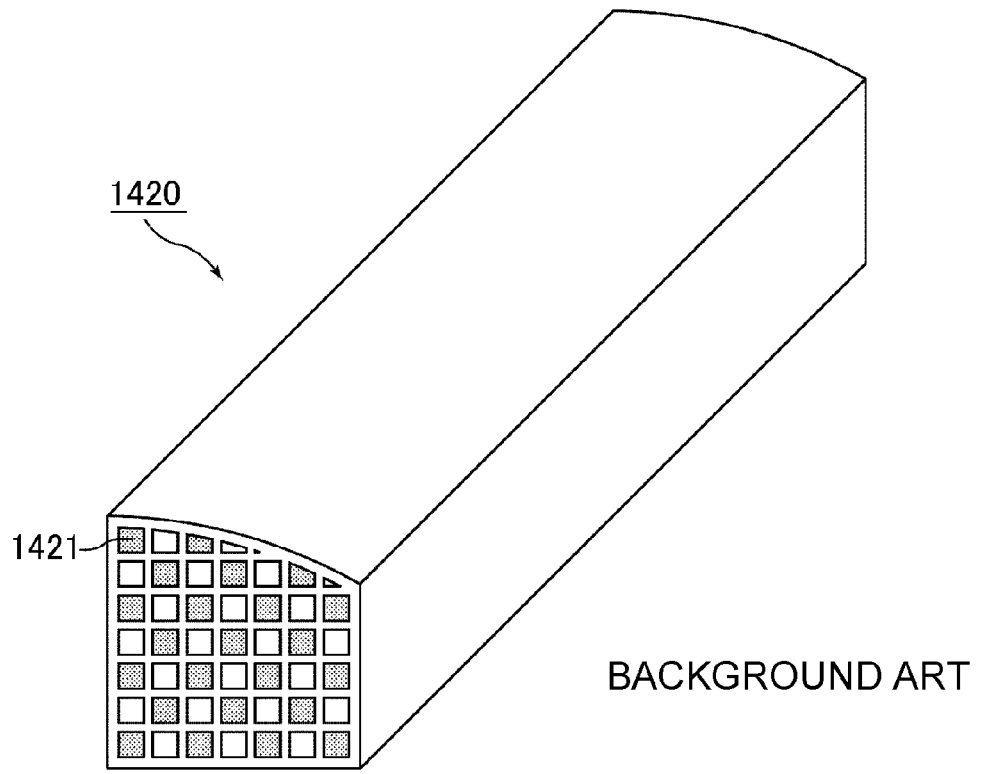
FIG. 1B is a perspective view schematically illustrating another exemplary honeycomb fired body positioned at the outermost periphery of a conventional honeycomb structure.

A honeycomb structure was manufactured in the same manner as in Example 1, except that the outer honeycomb fired body used here was a honeycomb fired body (see FIG. 1A and FIG. 1B) having the same shape as that of a conventional honeycomb fired body in which outer irregular cells are not provided and deformed cells are formed.

Measurement of the weight, the pressure loss, and the regeneration rate were performed on each of the honeycomb structures manufactured in Example 1 and Comparative Examples 1 and 2.
(Weight Measurement)

The weight (g) of the honeycomb structures manufactured in Example 1 and Comparative Examples 1 and 2 was measured by using an electronic scale. Based on the measurement, the weight ratio between the honeycomb structures of Example 1 and Comparative Example 1 was calculated with the assumption that the weight of the honeycomb structure of Comparative Example 2 was 1.

The weight of honeycomb structures of Example 1 and Comparative Examples 1 and 2 were 1521 g (weight ratio of 0.994), 1567 g (weight ratio of 1.024), and 1530 g (weight ratio of 1), respectively.
(Pressure Loss Measurement)

Figure 7:
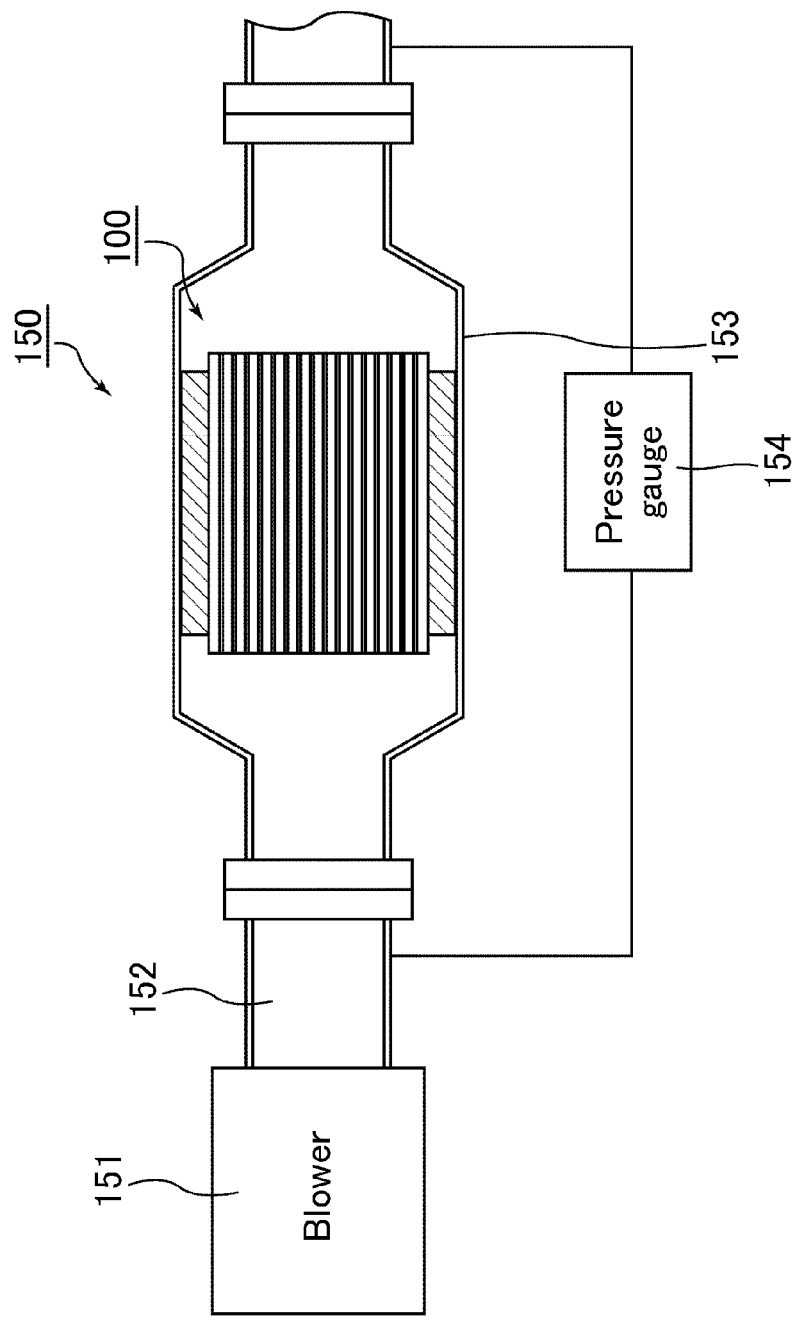
FIG. 7 is a diagram of a pressure loss measuring apparatus.

The pressure loss of each honeycomb structure in Example 1 and Comparative Examples 1 and 2 was measured with use of a pressure loss measuring apparatus 150 as illustrated in FIG. 7. The pressure loss measuring apparatus 150 had a structure in which a honeycomb structure 100 fixed in a metal casing 153 is placed in an exhaust gas pipe 152 connected with a blower 151, and a pressure gauge 154 was attached so as to be able to detect pressures at front and rear of the honeycomb structure 1. The blower 151 was driven in a manner such that the flow rate of exhaust gases was set to 400 m$^3$/h, and a pressure difference (pressure loss) was measured after five minutes from the start of the driving operation.

The pressure loss of the honeycomb structures of Example 1 and Comparative Examples 1 and 2 were 5.05 K·Pa, 5.08 K·Pa, and 5.09 K·Pa, respectively.

The weight measurement clarified that the weight of the honeycomb structure of Example 1 was the lightest. The reason for this is presumably as follows. A deformed cell having a cell cross-sectional shape deformed from that of the basic cell or having a cell cross-sectional area reduced from that of the basic cell was to be included in the peripheral cells in contact with the peripheral wall of the honeycomb fired body. Therefore, a cell wall between the deformed cell and a basic cell adjacent to the deformed cell was removed to provide an outer irregular cell in the honeycomb structure. As a result, the weight of the honeycomb structure was reduced compared to the honeycomb structure having such a cell wall therein.

The honeycomb structure of Comparative Example 1 was heavier than the honeycomb structure of Comparative Example 2. The reason for this is presumably that the level differences on the peripheral wall of the honeycomb fired body lengthened the peripheral wall and increased the amount of the coat layer.

With regard to the pressure loss, the honeycomb structure of Example 1 had the smallest pressure loss, which indicated that the honeycomb structure of Example 1 exerted the excellent suppressive effect on the increase in the pressure loss of the honeycomb structure. The reason for this is presumably as follows. Since the outer irregular cell having a cell cross-sectional area larger than that of the basic cell was provided in the outer honeycomb fired body, the aperture ratio of the entire honeycomb structure was improved. This reduced the thickness of a layer of PM during the PM accumulation, resulting in the lower exhaust gas flow resistance.

Here, consideration is given on the regeneration rate that is one property of the honeycomb structure.

The regeneration rate of the honeycomb structure refers to a percentage of PM removed in the regeneration treatment in the entire PM accumulated in the honeycomb structure (filter) under predetermined conditions. Measurement is specifically performed as follows. The weight of the honeycomb structure is preliminary measured before the accumulation of PM. Next, an engine is driven for a predetermined time under predetermined conditions so that a predetermined weight of PM is accumulated in the honeycomb structure. After that, the engine is driven for a predetermined time utilizing, for example, a post injection system so that the honeycomb structure is regenerated. Then, the weight of the regenerated honeycomb structure is measured. The regeneration rate (%) is calculated from the reduced amount of PM with use of the following formula (1).

Regeneration rate(%)=(Weight of *PM* before regeneration−Weight of *PM* after regeneration)/Weight of *PM* before regeneration (1)

With regard to the regeneration rate, it is presumable that the honeycomb structure according to Example 1 shows the highest value of the regeneration rate and has excellent regeneration efficiency. Since the cell wall between the deformed cell and the basic cell adjacent to the deformed cell has been removed in the honeycomb structure according to Example 1, the weight of the honeycomb structure is reduced compared to the weight of the honeycomb structures in Comparative Examples 1 and 2. This reduces the heat capacity of the honeycomb structure of Example 1 compared to the heat capacities of the honeycomb structures in Comparative Examples 1 and 2, and therefore, the temperature of the honeycomb structure during the regeneration process is more easily raised to promote the PM burning. Consequently, the regeneration rate is presumably improved.

Second Embodiment

Hereinafter, a second embodiment that is one embodiment of the present invention is described. The present embodiment is different from the first embodiment of the present invention in that a honeycomb block of the present embodiment includes one honeycomb fired body, whereas the honeycomb block of the first embodiment includes a plurality of honeycomb fired bodies.

The honeycomb structure according to the second embodiment of the present invention includes a honeycomb block including a honeycomb fired body having a large number of cells longitudinally placed in parallel with one another with a cell wall therebetween. The honeycomb block includes one honeycomb fired body. The cells include peripheral cells in contact with a peripheral wall of the honeycomb fired body and basic cells positioned under the peripheral cells. The peripheral cells include an irregular cell having a cell cross-sectional area larger than that of the basic cell.

In the honeycomb structure, though a basic condition is that the peripheral cells include at least one irregular cell, the irregular cells are preferably formed throughout the entire periphery because the effect of the embodiment of the present invention can be more surely exerted.

Figure 8:
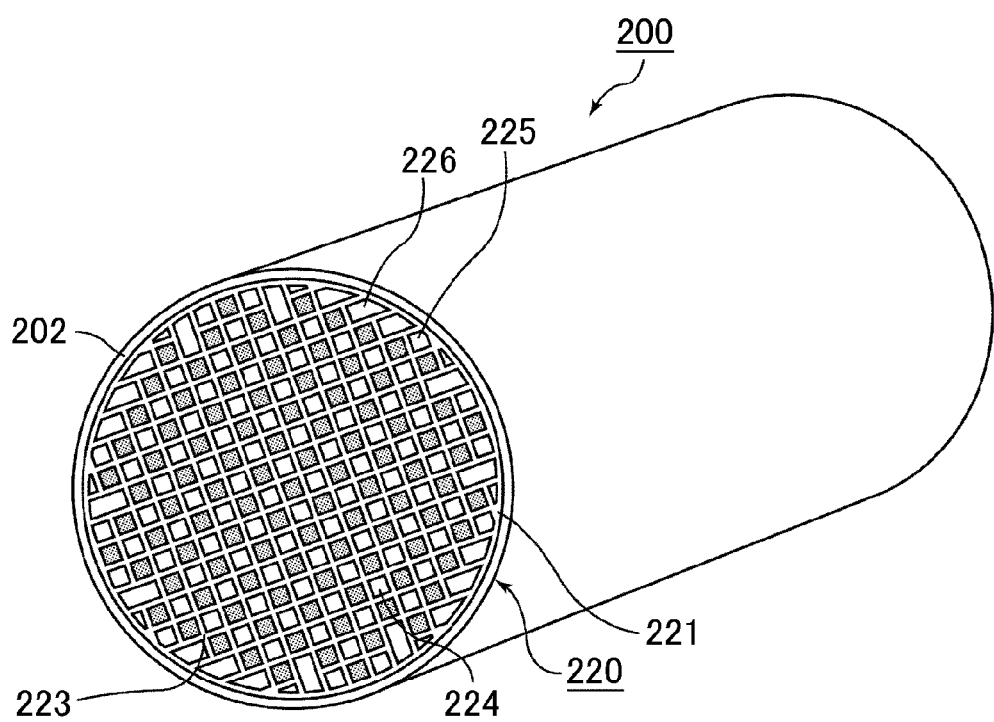
FIG. 8 is a perspective view schematically illustrating a honeycomb structure of a second embodiment of the present invention.

FIG. 8 is a perspective view schematically illustrating a honeycomb structure of the second embodiment of the present invention. A honeycomb structure 200 illustrated in FIG. 8 includes one pillar-shaped honeycomb fired body 220 having a large number of cells 224 and 225 longitudinally placed in parallel with one another with a cell wall 223 therebetween, and has a coat layer 202 formed around the honeycomb fired body 220. In the second embodiment of the present invention, the honeycomb fired body 220 corresponds to the honeycomb block in the first embodiment of the present invention. Here, the coat layer may be optionally formed according to need.

The honeycomb structure 200 includes basic cells 224 formed in a checkered pattern of the basic formation pattern and peripheral cells 225 in contact with a peripheral wall 221. The basic cells 224 and the peripheral cells 225 are alternately sealed at either end portions. The peripheral cells 225 include an irregular cell 226 having a cell cross-sectional area larger than that of the basic cell 224. The honeycomb fired body 220 included in the honeycomb structure 200 has a substantially round pillar shape and the entire peripheral wall 221 has a curved face. Therefore, deformed cells are likely to be formed in the peripheral cells 225. Accordingly, the irregular cells 226 are not unevenly formed along a specific part of the peripheral wall 221, but formed along the entire peripheral wall 221.

With regard to the method for manufacturing the honeycomb structure of the present embodiment, the honeycomb structure may be manufactured in the same manner as in the first embodiment of the present invention, except that a die used for extrusion molding is changed to manufacture a substantially round pillar-shaped honeycomb molded body. This honeycomb fired body can be used as a honeycomb block without bonding process. A coating material paste may be applied on the peripheral face of the honeycomb fired body as a honeycomb block to form a coating material paste layer, and the honeycomb structure of the present embodiment may be obtained by drying and solidifying the coating material paste layer.

The shape of the honeycomb fired body of the present embodiment is not limited to the substantially round pillar shape, and may be any shape such as a substantially cylindroid shape, a substantially rectangular pillar shape, and a pillar shape with a substantially-racetrack end face.

The effects (1) to (4) described in the first embodiment of the present invention are more likely to be exerted also in the present embodiment.

Third Embodiment

Hereinafter, a third embodiment that is one embodiment of the present invention is described. The present embodiment is different from the first embodiment of the present invention in that every honeycomb fired body forms a part of the periphery of the honeycomb block without a distinction of the outer honeycomb fired body and the inner honeycomb fired body, whereas the honeycomb fired bodies included in the honeycomb block of the first embodiment are distinguished between the outer honeycomb fired bodies and the inner honeycomb fired bodies.

A honeycomb structure according to the third embodiment of the present invention includes a honeycomb block including honeycomb fired bodies each having a large number of cells longitudinally placed in parallel with one another with a cell wall therebetween. The honeycomb block includes a plurality of honeycomb fired bodies bound to one another with an adhesive layer interposed therebetween. At least one of the honeycomb fired bodies has peripheral cells including an irregular cell having a cell cross-sectional area larger than that of the basic cell.

In the honeycomb structure, at least one of the honeycomb fired bodies has cells including the irregular cell. However, it is preferable that all the honeycomb fired bodies have cells including the irregular cells because the effect of the embodiment of the present invention is more likely to be surely exerted.

In addition, in the honeycomb structure, it is a basic condition that the peripheral cells include at least one irregular cell. Here, the irregular cells are preferably formed over the entire periphery because the effect of the embodiment of the present invention can be more surely exerted.

Figure 9A:
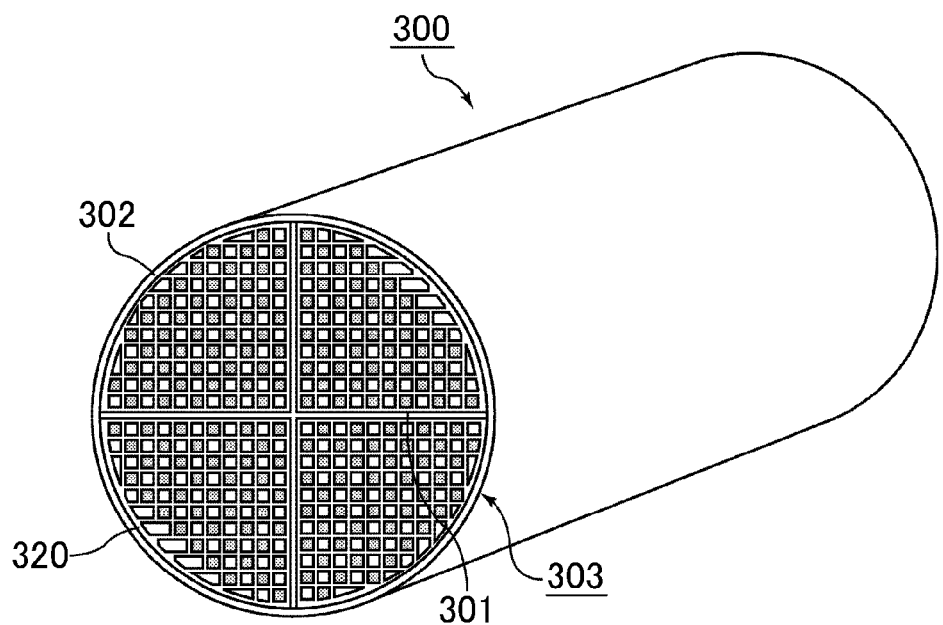
FIG. 9A is a perspective view schematically illustrating a honeycomb structure of a third embodiment of the present invention.
Figure 9B:
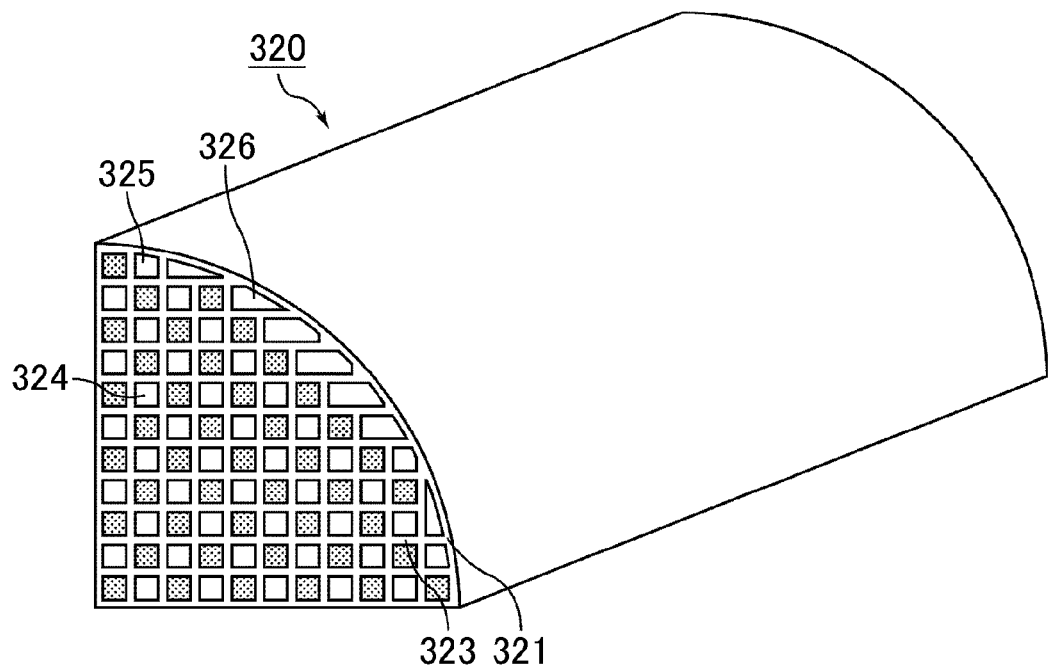
FIG. 9B is a perspective view schematically illustrating a honeycomb fired body in the honeycomb structure of the third embodiment of the present invention.

FIG. 9A is a perspective view schematically illustrating a honeycomb structure of the third embodiment of the present invention. FIG. 9B is a perspective view schematically illustrating a honeycomb fired body included in the honeycomb structure illustrated in FIG. 9A. A honeycomb structure 300 illustrated in FIG. 9A includes a honeycomb block 303 in which four honeycomb fired bodies 320 are bound to one another with an adhesive layer 301 interposed therebetween. The honeycomb block has a coat layer 302 formed on its periphery.

The honeycomb fired body 320 illustrated in FIG. 9B has a sector cross section with the central angle of about 90°. The honeycomb fired body 320 includes a large number of cells 324 and 325 longitudinally placed in parallel with one another with a cell wall 323 therebetween. The cells 324 and 325 are alternately sealed at either end portions.

In the honeycomb fired body 320, the cells include peripheral cells in contact with a peripheral wall 321 of the honeycomb fired body 320 and basic cells 324 that are positioned under the peripheral cells 325 and are formed in a checkered pattern of the basic formation pattern. The peripheral cells 325 include an irregular cell 326 having a cell cross-sectional area larger than that of the basic cells 324.

With regard to the method for manufacturing the honeycomb structure of the present embodiment, the honeycomb structure may be manufactured in the same manner as in the first embodiment of the present invention, except that a die used for extrusion molding is changed to manufacture a sector honeycomb molded body. The central angle of the sector cross section of the honeycomb molded body is not limited to about 90°, and it may be any angle such as about 30°, about 45°, about 60°, and about 120°.

The effects (1) to (4) described in the first embodiment of the present invention are more likely to be exerted also in the present embodiment.

Fourth Embodiment

Hereinafter, a fourth embodiment that is one embodiment of the present invention is described. The present embodiment is different from the first embodiment of the present invention in that the honeycomb block includes one honeycomb fired body, and the basic cells have large and small cell cross-sectional areas as the basic formation pattern, whereas the honeycomb block of the first embodiment includes a plurality of honeycomb fired bodies and the basic cells have substantially the same cell cross-sectional areas. The present embodiment may be described as an embodiment in which the honeycomb structure of the second embodiment of the present invention has the basic cells having large and small cell cross-sectional areas.

Figure 10:
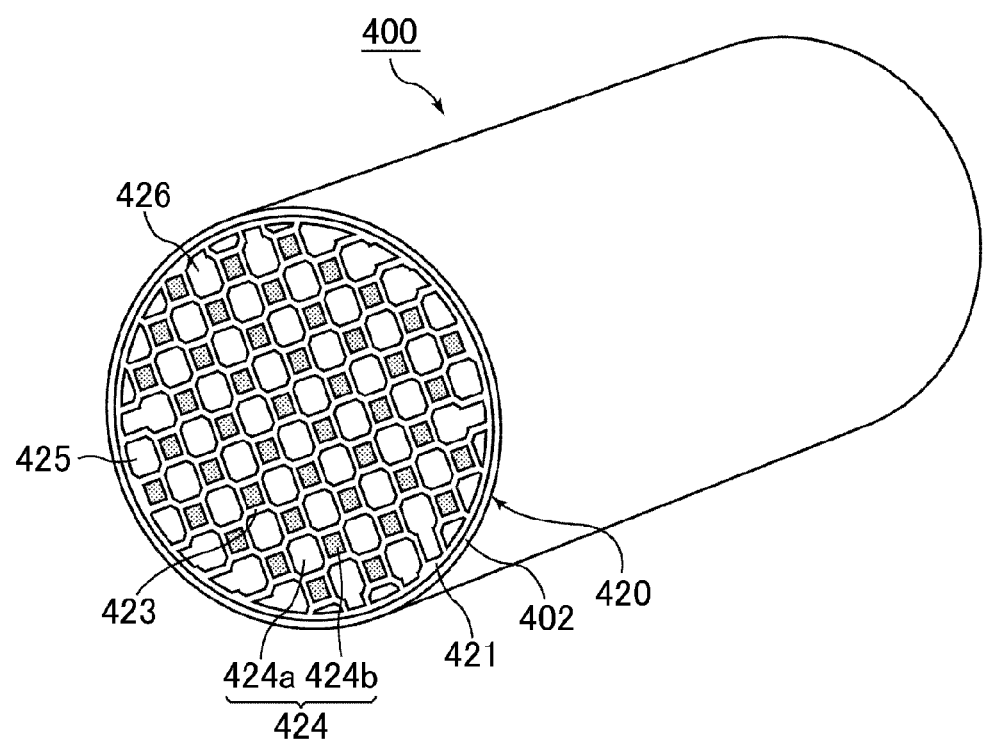
FIG. 10 is a perspective view schematically illustrating a honeycomb structure of a fourth embodiment of the present invention.

FIG. 10 is a perspective view schematically illustrating a honeycomb structure of the fourth embodiment of the present invention. A honeycomb structure 400 illustrated in FIG. 10 has one pillar-shaped honeycomb fired body 420 including a large number of cells 424 and 425 longitudinally placed in parallel with one another with a cell wall 423 therebetween. The honeycomb fired body 420 has a coat layer 402 formed on its periphery. Here, the coat layer may be optionally formed according to need.

The honeycomb structure 400 includes basic cells 424 (424a and 424b) formed by a predetermined basic formation pattern and peripheral cells 425 in contact with a peripheral wall 421. The basic cells 424 and the peripheral cells 425 are alternately sealed at either end portions.

The basic cells 424 include a first basic cell 424a formed by a first basic formation pattern and a second basic cell 424b formed by a second basic formation pattern. The first basic cell 424a has a cell cross-sectional area larger than that of the second basic cell 424b. The first basic formation pattern forms a first basic cell having a substantially-octagonal cross section. The second basic formation pattern forms a second basic cell having a substantially-square cross section.

The first and second basic formation patterns are not limited to the formation patterns for forming cells having substantially-octagonal and substantially-square cell cross-sections, and may be any formation patterns as long as the cell cross-sectional area of the first basic cell is larger than that of the second basic cell. For example, both of the first and second formation patterns form cells having substantially-square cross sections and being different only in the cell cross-sectional areas.

In the honeycomb structure 400, a plurality of irregular cells 426 each having a cross-sectional area larger than that of the first basic cell 424a are provided, as peripheral cells 425. The irregular cells 426 are placed so as to adjacent to the second basic cells 426b. Accordingly, in the case that the honeycomb structure 400 of the present embodiment is used as an exhaust gas purifying filter, the aperture ratio of the entire honeycomb structure is more likely to be improved by the configuration in which the first basic cells 424a and the irregular cells 426 are exhaust gas inlet side cells and the second basic cells 424b are exhaust gas outlet side cells. However, depending on the position where an irregular cell is to be formed, the irregular cell may have a cell cross-sectional area larger than that of the second basic cell 424b and may be adjacent to the first basic cell 424a.

With regard to the method for manufacturing the honeycomb structure of the present embodiment, the honeycomb structure may be manufactured in the same manner as in the first embodiment of the present invention, except that a die used for extrusion molding is changed to manufacture a substantially round pillar-shaped honeycomb molded body including basic cells having large and small cell cross-sectional areas. The shape of the honeycomb molded body is not limited to the substantially round pillar shape, and may be any shape such as a substantially cylindroid shape, a substantially rectangular pillar shape, and a pillar shape with a substantially racetrack end face.

The effects (1) to (4) described in the first embodiment of the present invention are more likely to be exerted also in the present embodiment.

(5) In the honeycomb structure of the present embodiment, the basic cells include the first basic cells formed by the first basic formation pattern and the second basic cells formed by the second basic formation pattern. The first basic cell has a cell cross-sectional area larger than that of the second basic cell. Use of the first basic cell as an exhaust gas inlet side cell allows the aperture ratio on the exhaust gas inlet side of the honeycomb structure to be larger than that on the exhaust gas outlet side. In this manner, it is possible to reduce the increasing rate of the pressure loss of the honeycomb structure during the PM accumulation.

(6) In the honeycomb structure of the present embodiment, the irregular cell has a cell cross-sectional area larger than that of the first basic cell and is adjacent to the second basic cell. When the honeycomb structure has the first basic cell and the second basic cell as the basic cells, the irregular cell may be adjacent both the first basic cell and the second basic cell. However, as in the present embodiment, use of the irregular cell, which is provided adjacent to the second basic cell mainly used as an exhaust gas outlet side cell, as an exhaust gas inlet side cell is more likely to allow the aperture ratio of the honeycomb structure to be further increased. As a result, it is easier to reduce the increasing rate of the pressure loss of the honeycomb structure during the PM accumulation.

Fifth Embodiment

Hereinafter, a fifth embodiment that is one embodiment of the present invention is described. The present embodiment is different from the first embodiment of the present invention in that every honeycomb fired body forms a part of the periphery of the honeycomb block without a distinction of the outer honeycomb fired body and the inner honeycomb fired body and the basic cells have large and small cell cross-sectional areas as the basic formation pattern, whereas the honeycomb fired bodies of the first embodiment of the present invention include the outer honeycomb fired bodies and the inner honeycomb fired bodies and the cell cross-sectional areas of the basic cells are substantially the same. The present embodiment may be described as an embodiment in which the honeycomb structure of the third embodiment of the present invention has the basic cells having large and small cell cross-sectional areas.

Figure 11A:
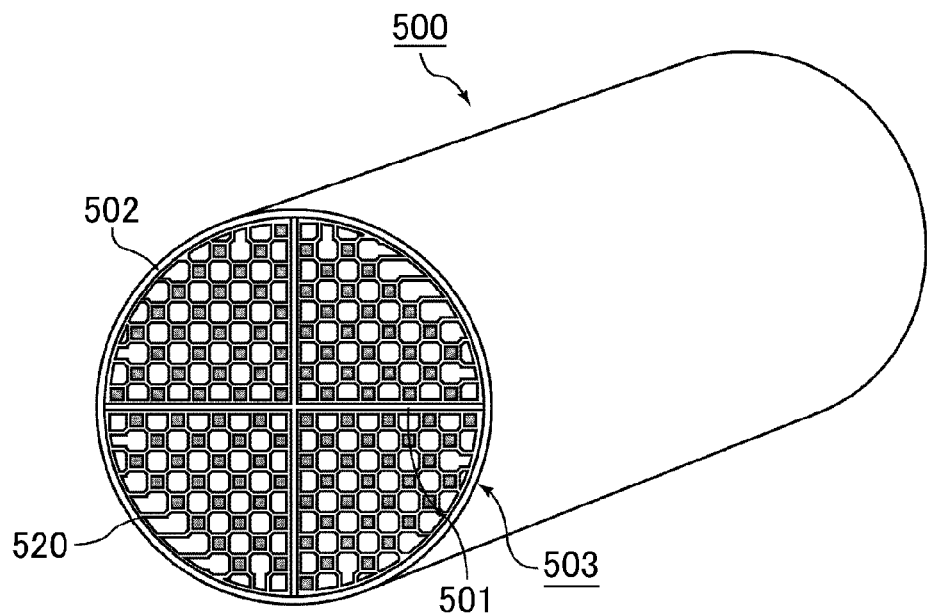
FIG. 11A is a perspective view schematically illustrating a honeycomb structure of a fifth embodiment of the present invention.
Figure 11B:
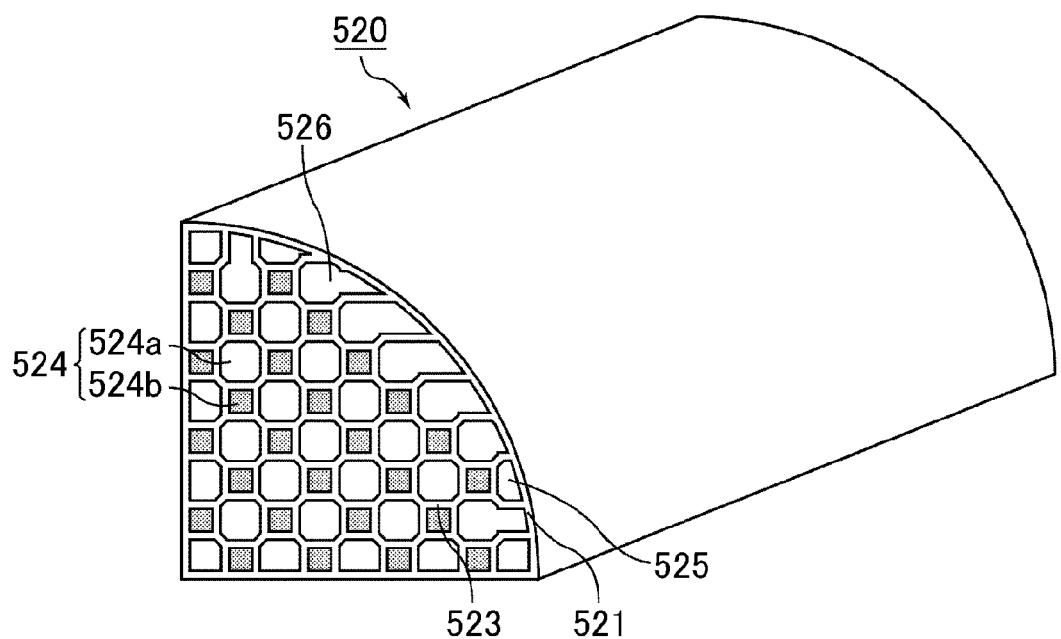
FIG. 11B is a perspective view schematically illustrating a honeycomb fired body in the honeycomb structure of the fifth embodiment of the present invention.

FIG. 11A is a perspective view schematically illustrating the honeycomb structure of the fifth embodiment of the present invention. FIG. 11B is a perspective view schematically illustrating a honeycomb fired body included in the honeycomb structure of FIG. 11A. In a honeycomb structure 500 illustrated in FIG. 11A, four honeycomb fired bodies 520 are bound to one another with an adhesive layer 501 interposed therebetween to form a honeycomb block 503. Further, the honeycomb block 503 has a coat layer 502 formed on its periphery.

The honeycomb fired body 520 illustrated in FIG. 11B has a substantially sector cross section with the central angle of about 90°. In the honeycomb fired body 520, a large number of cells 524 and 525 are longitudinally placed in parallel with one another with a cell wall 523 therebetween and either end portions of the cells 524 and 525 are sealed with plugs. In the honeycomb fired body 520, the cells include basic cells 524 (524a and 524b) formed by a predetermined basic formation patterns and peripheral cells 525 in contact with a peripheral wall 521.

The basic cells 524 include a first basic cell 524a formed by a first basic formation pattern and a second basic cell 524b formed by a second basic formation pattern. The first basic cell 524a has a cell cross-sectional area larger than that of the second basic cell 524b. The first basic formation pattern forms a first basic cell having a substantially-octagonal cross section. The second basic formation pattern forms a second basic cell having a substantially-square cross section.

The first and second basic formation patterns are not limited to the formation patterns for forming cells having substantially-octagonal and substantially-square cell cross-sections, and may be any formation patterns as long as the cell cross-sectional area of the first basic cell is larger than that of the second basic cell. For example, both of the first and second formation patterns may form cells having substantially-square cross sections and being different only in the cell cross-sectional areas.

When the first and second basic cells are in contact with the peripheral walls corresponding to the two line segments forming a substantially sector cross section of the honeycomb fired body as peripheral cells, the second basic cell is formed by the second basic formation pattern to be a peripheral cell having a substantially-square cross section. In contrast, the first basic cell in that case has a deformed cross-sectional shape of a substantially-hexagonal shape. Further, when the second basic cell is in contact with the intersection of the peripheral walls corresponding to two line segments of the substantially-sector cross section, the second basic cell becomes a peripheral cell having a substantially-square cell cross-sectional shape. However, the first basic cell becomes a peripheral cell having a substantially-pentagonal cell cross-sectional shape in that case.

In the honeycomb structure 500, a plurality of irregular cells 526 are formed as peripheral cells 525, each of which has a cell cross-sectional area larger than that of the first basic cell 524a. The irregular cells 526 are formed so as to be adjacent to the second basic cells 524b. In the case that the honeycomb structure 500 of the present embodiment is used as an exhaust gas purifying filter, the aperture ratio of the entire honeycomb structure is more likely to be improved by the configuration in which the first basic cells 524a and the irregular cells 526 are exhaust gas inlet side cells and the second basic cells 524b are exhaust gas outlet side cells. However, depending on the position where an irregular cell is to be formed, the irregular cell may have a cell cross-sectional area larger than that of the second basic cell 524b and may be adjacent to the first basic cell 524a.

With regard to the method for manufacturing the honeycomb structure of the present embodiment, the honeycomb structure may be manufactured in the same manner as in the first embodiment of the present invention, except that a die used for extrusion molding is changed to manufacture a honeycomb molded body having a substantially-sector cross section and including basic cells having large and small cell cross-sectional areas. The central angle of the sector cross section of the honeycomb molded body is not limited to about 90°, and it may be any angle such as about 30°, about 45°, about 60°, and about 120°.

The effects (1) to (6) described in the fourth embodiment of the present invention are more likely to be exerted also in the present embodiment.

Other Embodiments

The porosity of the honeycomb fired body included in the honeycomb structure according to the embodiment of the present invention is not particularly limited and is preferably at least about 35% and at most about 60%.

The porosity of the honeycomb fired body of about 35% or more is less likely to cause early clogging in the honeycomb structure according to the embodiment of the present invention. In contrast, the porosity of the honeycomb fired body of about 60% or less is less likely to lower the strength of the honeycomb fired body. As a result, the honeycomb fired body is less likely to be easily broken.

The honeycomb fired body preferably has the average pore size of at least about 5 μm and at most about 30 μm.

The average pore size of the honeycomb fired body of about 5 μm or more is less likely to allow particulates to easily clog the honeycomb fired body. In contrast, the average pore size of the honeycomb fired body of about 30 μm or less is less likely to allow particulates to pass through the pores. In such a case, the honeycomb structure surely captures particulates and functions as a filter.

The porosity and the average pore size of the honeycomb fired body according to the embodiment of the present invention can be measured by a conventionally known method of a mercury penetration method.

The thickness of the cell wall of the honeycomb fired body according to the embodiment of the present invention is not particularly limited and is preferably at least about 0.1 mm and at most about 0.4 mm.

The thickness of the cell wall of the honeycomb fired body of about 0.1 mm or more is less likely to make the thickness of the cell wall supporting the honeycomb structure too thin, leading to maintenance of the strength of the honeycomb fire body. In contrast, the thickness of the cell wall of the honeycomb fired body of about 0.4 mm or less is less likely to cause the increase in the pressure loss of the honeycomb structure.

The thickness of the outer wall (peripheral wall) of the honeycomb fired body included in the honeycomb structure according to the embodiment of the present invention is not particularly limited and is preferably at least about 0.1 mm and at most about 0.4 mm, which is similar to the range of the thickness of the cell wall of the honeycomb fired body.

The cell density in a cross section vertical to the longitudinal direction of the honeycomb fired body according to the embodiment of the present invention is not particularly limited, and the lower limit thereof is preferably about 31.0 pcs/cm$^2$ (about 200 pcs/in$^2$) and the upper limit thereof is preferably about 93.0 pcs/cm$^2$ (about 200 pcs/in$^2$). The lower limit of the cell density is more preferably about 38.8 pcs/cm$^2$ (about 250 pcs/in$^2$) and the upper limit thereof is more preferably about 77.5 pcs/cm$^2$ (about 500 pcs/in$^2$).

The main component of the material for the honeycomb fired body according to the embodiment of the present invention is not limited to silicon carbide and may contain other ceramic materials. The other ceramic materials refer to ceramic powder including: ceramic nitrides such as aluminium nitride, silicon nitride, boron nitride, and titanium nitride; ceramic carbides such as zirconium carbide, titanium carbide, tantalum carbide, and tungsten carbide; and ceramic oxides such as alumina, zirconia, cordierite, mullite, and aluminium titanate. Among these, non-oxide ceramics are preferable and silicon carbide is particularly preferable because of its excellent heat resistance, mechanical strength, thermal conductivity, and the like. Further, the ceramic materials also include silicon-containing ceramics obtainable by blending metal silicon with any of the above-mentioned ceramics and ceramics obtainable by bonding any of the above-mentioned ceramics with silicon or a silicate compound. Among these, silicon carbide added with metal silicon (silicon-containing silicon carbide) is preferable. Especially, a silicon-containing silicon carbide ceramic containing about 60% by weight or more of silicon carbide is preferable.

The particle size of the ceramic powder is not particularly limited and the ceramic powder that tends not to cause the case where the size of the honeycomb fired body manufactured by the following firing treatment becomes smaller than the size of the honeycomb molded body is desirable. For example, a combination use of 100 parts by weight of ceramic powder having the average particle size of at least about 1.0 μm and at most about 50 μm and at least about 5 parts by weight and at most about 65 parts by weight of ceramic powder having the average particle size of at least about 0.1 μm and at most about 1.0 μm is preferable. In order to adjust the pore diameter and the like of the honeycomb fired body, it is necessary to adjust the firing temperature. However, it is also possible to adjust the pore diameter by adjusting the particle size of the ceramic powder.

The organic binder in the wet mixture is not particularly limited, and examples thereof include methylcellulose, carboxy methylcellulose, hydroxy ethylcellulose, polyethylene glycol, and the like. Methylcellulose is preferable among these. A blending amount of the organic binder is preferably at least about 1 part by weight and at most about 10 parts by weight for 100 parts by weight of ceramic powder.

The plasticizer in the wet mixture is not particularly limited, and examples thereof include glycerin and the like. The lubricant is not particularly limited, and examples thereof include polyoxyalkylene-based compounds and the like such as polyoxyethylene alkyl ether and polyoxypropylene alkyl ether. Specific examples of the lubricant include polyoxyethylene monobutyl ether, polyoxypropylene monobutyl ether, and the like.

Moreover, the plasticizer and the lubricant may not be contained in the wet mixture in some cases.

In addition, a dispersant solution may be used upon preparing a wet mixture, and examples of the dispersant solution include water, an organic solvent such as benzene, alcohol such as methanol, and the like. Furthermore, a molding aid may be added to the wet mixture. The molding aid is not particularly limited, and examples thereof include ethylene glycol, dextrin, fatty acid, fatty acid soap, polyalcohol and the like.

Furthermore, a pore-forming agent and the like such as balloons that are fine hollow spheres including oxide-based ceramics, spherical acrylic particles, and graphite may be added to the wet mixture, if necessary. The balloon is not particularly limited, and examples thereof include alumina balloon, glass micro balloon, shirasu balloon, fly ash balloon (FA balloon), mullite balloon, and the like. Alumina balloon is desirable among these.

The plug material paste for sealing the cells is not particularly limited and is preferably manufacture a plug having a porosity of at least about 30% and at most about 75% through the subsequent processes. For example, it is possible to use a plug material paste having the same composition as that of the wet mixture.

Examples of the inorganic binder in the adhesive paste and the coating material paste include silica sol, alumina sol, and the like. Each of these materials may be used alone, or two or more of these may be used in combination. Silica sol is preferable among the inorganic binders.

Examples of the organic binder in the adhesive paste and the coating material paste include polyvinyl alcohol, methyl cellulose, ethyl cellulose, carboxymethyl cellulose, and the like. Each of these may be used alone, or two or more of these may be used in combination. Carboxymethyl cellulose is preferable among the organic binders.

Examples of the inorganic fibers in the adhesive paste and the coating material paste include ceramic fibers and the like such as silica-alumina, mullite, alumina, and silica. Each of these may be used alone or two or more kinds of these may be used in combination. Alumina fibers are desirable among the inorganic fibers.

Examples of the inorganic particles in the adhesive paste and the coating material paste include carbides, nitrides, and the like, and specific examples thereof include inorganic powder made from silicon carbide, silicon nitride, and boron nitride. Each of these may be used alone, or two or more of these may be used in combination. Among the inorganic particles, silicon carbide is preferably used due to its superior thermal conductivity.

Moreover, a pore-forming agent such as balloons that are fine hollow spheres including oxide-based ceramics, spherical acrylic particles and graphite may be added to the adhesive paste and the coating material paste, if necessary. The balloons are not particularly limited, and examples thereof include alumina balloons, glass micro-balloons, shirasu balloons, fly ash balloons (FA balloons), mullite balloons, and the like. Alumina balloons are preferable among these.

A catalyst may be supported on the honeycomb structure according to the embodiment of the present invention.

In the honeycomb structure according to the embodiment of the present invention, by supporting a catalyst capable of converting toxic gas components in exhaust gases thereon, such as CO, HC, and $NO_x$, it becomes possible to convert the toxic gas components in the exhaust gases by catalytic reaction. Further, by supporting a catalyst which assists burning of PM, it becomes possible to burn and remove PM more easily.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising:
    a honeycomb block including at least one honeycomb fired body having cell walls extending along a longitudinal direction of the at least one honeycomb fired body to define cells, the cells comprising:
        peripheral cells in contact with peripheral walls of the at least one honeycomb fired body;
        basic cells positioned to be surrounded by the peripheral cells, the basic cells including outermost basic cells which are in contact with the peripheral cells; and
        the peripheral cells including an irregular cell having a cell cross-sectional area larger than a cell cross-sectional area of each of the outermost basic cells.

2. The honeycomb structure according to claim 1, wherein
the honeycomb block comprises one honeycomb fired body.

3. The honeycomb structure according to claim 1, wherein
the honeycomb block comprises a plurality of honeycomb fired bodies bound to one another with an adhesive layer interposed therebetween, and
at least one of the plurality of honeycomb fired bodies has the peripheral cells including the irregular cell having the cell cross-sectional area larger than the cell cross-sectional area of each of the outermost basic cells.

4. The honeycomb structure according to claim 3, wherein
the irregular cell is formed at a position in contact with a peripheral wall forming a periphery of the honeycomb block among peripheral walls of the plurality of honeycomb fired bodies.

5. The honeycomb structure according to claim 3, wherein
the irregular cell is formed at a position in contact with a peripheral wall facing to the adhesive layer among peripheral walls of the plurality of honeycomb fired bodies.

6. The honeycomb structure according to claim 3, wherein
the plurality of honeycomb fired bodies include
    a plurality of outer honeycomb fired bodies forming a periphery of the honeycomb block and
    at least one inner honeycomb fired body positioned to be surrounded by the plurality of outer honeycomb fired bodies,
the honeycomb block comprises the plurality of outer honeycomb fired bodies and the at least one inner honeycomb fired body bound to one another with an adhesive layer interposed therebetween,
at least one of the plurality of outer honeycomb fired bodies has the cells including
    outer peripheral cells in contact with peripheral walls of the plurality of outer honeycomb fired bodies and
    outer basic cells positioned to be surrounded by the outer peripheral cells, the outer basic cells including outermost outer basic cells which are in contact with the outer peripheral cells, and
the outer peripheral cells include an outer irregular cell having a cell cross-sectional area larger than a cell cross-sectional area of each of the outermost outer basic cells.

7. The honeycomb structure according to claim 6, wherein
the outer irregular cell is formed at a position in contact with a peripheral wall forming the periphery of the honeycomb block among the peripheral walls of the plurality of outer honeycomb fired bodies.

8. The honeycomb structure according to claim 6, wherein
the outer irregular cell is formed at a position in contact with a peripheral wall facing to the adhesive layer among the peripheral walls of the plurality of outer honeycomb fired bodies.

9. The honeycomb structure according to claim 6, wherein
the outer basic cells include a first outer basic cell and a second outer basic cell, and
the first outer basic cell has a cell cross-sectional area larger than a cell cross-sectional area of the second outer basic cell.

10. The honeycomb structure according to claim 9, wherein
the outer irregular cell has a cell cross-sectional area larger than the cell cross-sectional area of the first outer basic cell and is positioned adjacent to the second outer basic cell.

11. The honeycomb structure according to claim 9, wherein
the outer irregular cell has a cell cross-sectional area larger than the cell cross-sectional area of the second outer basic cell and is positioned adjacent to the first outer basic cell.

12. The honeycomb structure according to claim 9, wherein
the first outer basic cell and the second outer basic cell have a fifth basic formation pattern and a sixth basic formation pattern, respectively, and
the fifth basic formation pattern is for forming a cell having a substantially-octagonal cross section and the sixth basic formation pattern is for forming a cell having a substantially-square cross section.

13. The honeycomb structure according to claim 9, wherein
the first outer basic cell and the second outer basic cell have a seventh basic formation pattern and a eighth basic formation pattern, respectively, and
both the seventh basic formation pattern and the eighth basic formation pattern are for forming a cell having a substantially-square cross section.

14. The honeycomb structure according to claim 6, wherein
the at least one inner honeycomb fired body has the cells including
 inner peripheral cells in contact with peripheral walls of the at least one inner honeycomb fired body and
 inner basic cells positioned to be surrounded by the inner peripheral cells, the inner basic cells including outermost inner basic cells which are in contact with the inner peripheral cells, and
the inner peripheral cells include an inner irregular cell having a cell cross-sectional area larger than a cell cross-sectional area of each of the outermost inner basic cells.

15. The honeycomb structure according to claim 6, wherein
the plurality of outer honeycomb fired bodies include third end portions and fourth end portions opposite to the third end portions in the longitudinal direction,
the at least one inner honeycomb fired body includes fifth end portion and sixth end portion opposite to the fifth end portion in the longitudinal direction,
the cells in the plurality of outer honeycomb fired bodies are alternately sealed at the third end portions and the fourth end portions, and
the cells in the at least one inner honeycomb fired body are alternately sealed at the fifth end portion and the sixth end portion.

16. The honeycomb structure according to claim 6, wherein
each of the plurality of outer honeycomb fired bodies has the outer irregular cell.

17. The honeycomb structure according to claim 6, wherein
the outer irregular cells are formed over an entire periphery of the honeycomb block.

18. The honeycomb structure according to claim 6, wherein
eight pieces of the plurality of outer honeycomb fired bodies are positioned to form the periphery of the honeycomb block and four pieces of the at least one inner honeycomb fired body are positioned to be surrounded by the plurality of outer honeycomb fired bodies.

19. The honeycomb structure according to claim 6, wherein
a cross-sectional shape of each of the plurality of outer honeycomb fired bodies is a shape surrounded by three line segments and one arc.

20. The honeycomb structure according to claim 19, wherein
two angles formed by two line segments out of the three line segments are about 90° and about 135°.

21. The honeycomb structure according to claim 6, wherein
the outer peripheral cells include a deformed cell, and
a cell cross-sectional area of the deformed cell to be sealed is about 80% or less of a cell cross-sectional area of one of the outer basic cells, when the deformed cell is bound with one of the outer basic cells to form the outer irregular cell.

22. The honeycomb structure according to claim 3, wherein
each of the plurality of honeycomb fired bodies forms a part of a periphery of the honeycomb block.

23. The honeycomb structure according to claim 22, wherein
four pieces of the plurality of honeycomb fired bodies are bound to one another with an adhesive layer interposed therebetween to form the honeycomb block and each of the plurality of honeycomb fired bodies has a sector cross section with a central angle of about 90°.

24. The honeycomb structure according to claim 22, wherein
a central angle of a sector cross section of each of the plurality of honeycomb fired bodies is about 30°, about 45°, about 60°, or about 120°.

25. The honeycomb structure according to claim 1, wherein
the basic cells comprise a first basic cell and a second basic cell, and
the first basic cell has a cell cross-sectional area larger than a cell cross-sectional area of the second basic cell.

26. The honeycomb structure according to claim 25, wherein
the irregular cell has a cell cross-sectional area larger than the cell cross-sectional area of the first basic cell and is positioned adjacent to the second basic cell.

27. The honeycomb structure according to claim 25, wherein
the irregular cell has a cell cross-sectional area larger than the cell cross-sectional area of the second basic cell and is positioned adjacent to the first basic cell.

28. The honeycomb structure according to claim 25, wherein
the first basic cell and the second basic cell have a first basic formation pattern and a second basic formation pattern, respectively, and
the first basic formation pattern is for forming a cell having a substantially-octagonal cross section and the second basic formation pattern is for forming a cell having a substantially-square cross section.

29. The honeycomb structure according to claim 25, wherein
the first basic cell and the second basic cell have a third basic formation pattern and a fourth basic formation pattern, respectively, and
both the third basic formation pattern and the fourth basic formation pattern are for forming a cell having a substantially-square cross section.

30. The honeycomb structure according to claim 1, wherein
the at least one honeycomb fired body includes a first end portion and a second end portion opposite to the first end portion in the longitudinal direction,
the basic cells are alternately sealed at the first end portion and the second end portion, and
the peripheral cells are alternately sealed at the first end portion and the second end portion.

31. The honeycomb structure according to claim 1, wherein
the honeycomb block includes a plurality of outer honeycomb fired bodies and a plurality of inner honeycomb fired bodies bound to one another with an adhesive layer interposed therebetween, the plurality of outer honeycomb fired bodies forming a periphery of the honeycomb block, the plurality of inner honeycomb fired bodies being positioned to be surrounded by the plurality of outer honeycomb fired bodies,
at least one of the plurality of inner honeycomb fired bodies has the cells including
inner peripheral cells in contact with peripheral walls of the plurality of inner honeycomb fired bodies and
inner basic cells positioned to be surrounded by the inner peripheral cells, the inner basic cells including outermost inner basic cells which are in contact with the inner peripheral cells, and
the inner peripheral cells include an inner irregular cell having a cell cross-sectional area larger than a cell cross-sectional area of each of the outermost inner basic cells.

32. The honeycomb structure according to claim 31, wherein
the inner basic cells comprise a first inner basic cell and a second inner basic cell, and
the first inner basic cell has a cell cross-sectional area larger than a cell cross-sectional area of the second inner basic cell.

33. The honeycomb structure according to claim 32, wherein
the inner irregular cell has a cell cross-sectional area larger than the cell cross-sectional area of the first inner basic cell and is positioned adjacent to the second inner basic cell.

34. The honeycomb structure according to claim 32, wherein
the inner irregular cell has a cell cross-sectional area larger than the cell cross-sectional area of the second inner basic cell and is positioned adjacent to the first inner basic cell.

35. The honeycomb structure according to claim 32, wherein
the first inner basic cell and the second inner basic cell have a ninth basic formation pattern and a tenth basic formation pattern, respectively, and
the ninth basic formation pattern is for forming a cell having a substantially-octagonal cross section and the tenth basic formation pattern is for forming a cell having a substantially-square cross section.

36. The honeycomb structure according to claim 32, wherein
the first inner basic cell and the second inner basic cell have a eleventh basic formation pattern and a twelfth basic formation pattern, respectively, and
both the eleventh basic formation pattern and the twelfth basic formation pattern are for forming a cell having a substantially-square cross section.

37. The honeycomb structure according to claim 31, wherein
the cells in at least one of the plurality of outer honeycomb fired bodies include
outer peripheral cells adjacent to peripheral walls of the plurality of outer honeycomb fired bodies and
outer basic cells positioned to be surrounded by the outer peripheral cells, the outer basic cells including outermost outer basic cells which are in contact with the outer peripheral cells, and
the outer peripheral cells include an outer irregular cell having a cell cross-sectional area larger than a cell cross-sectional area of each of the outermost outer basic cells.

38. The honeycomb structure according to claim 1, wherein
a coat layer is formed on a periphery of the honeycomb block.

39. The honeycomb structure according to claim 1, wherein
the at least one honeycomb fired body has a porosity of at least about 35% and at most about 60%.

40. The honeycomb structure according to claim 1, wherein
the at least one honeycomb fired body has an average pore size of at least about 5 μm and at most about 30 μm.

41. The honeycomb structure according to claim 1, wherein
the at least one honeycomb fired body has the cell walls with thicknesses of at least about 0.1 mm and at most about 0.4 mm.

42. The honeycomb structure according to claim 1, wherein
a cell density in a cross section vertical to the longitudinal direction of the at least one honeycomb fired body has a lower limit of about 31 pcs/cm$^2$ and an upper limit of about 93 pcs/cm$^2$.

43. The honeycomb structure according to claim 1, wherein
a main component of material for the at least one honeycomb fired body comprises a ceramic nitride, a ceramic carbide, or a ceramic oxide.

44. The honeycomb structure according to claim 43, wherein
the main component of the material for the at least one honeycomb fired body comprises a non-oxide ceramic.

45. The honeycomb structure according to claim 44, wherein
the at least one honeycomb fired body is made of a porous silicon carbide sintered body.

46. The honeycomb structure according to claim 44, wherein
the at least one honeycomb fired body is made of a silicon-containing silicon carbide sintered body.

47. The honeycomb structure according to claim 1, comprising:
a catalyst supported thereon.

* * * * *